(12) United States Patent
Cornelius

(10) Patent No.: US 7,022,810 B1
(45) Date of Patent: Apr. 4, 2006

(54) PROTON EXCHANGE MEMBRANE MATERIALS FOR THE ADVANCEMENT OF DIRECT METHANOL FUEL-CELL TECHNOLOGY

(75) Inventor: Christopher J. Cornelius, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/739,644

(22) Filed: Dec. 18, 2003

Related U.S. Application Data

(60) Provisional application No. 60/469,321, filed on May 9, 2003.

(51) Int. Cl.
 C08G 73/10 (2006.01)
 C08G 69/28 (2006.01)
 C08L 77/00 (2006.01)

(52) U.S. Cl. ............ 528/353; 528/125; 528/126; 528/128; 528/170; 528/171; 528/172; 528/173; 528/174; 528/176; 528/179; 528/183; 528/185; 528/220; 528/229; 528/310; 528/350; 528/351; 528/353; 528/373; 525/420; 525/422; 525/432; 525/436

(58) Field of Classification Search ........ 528/125–126, 528/128, 170–174, 176, 179, 183, 185, 220, 528/229, 310, 373, 350–353; 525/420, 436, 525/422, 432
See application file for complete search history.

(56) References Cited

U.S. PATENT DOCUMENTS

| | | | | |
|---|---|---|---|---|
| 5,304,626 A | * | 4/1994 | Burgess et al. | 528/353 |
| 5,328,979 A | * | 7/1994 | Harris et al. | 528/353 |
| 5,952,448 A | * | 9/1999 | Lee et al. | 528/170 |
| 6,059,943 A | | 5/2000 | Murphy et al. | 204/296 |
| 6,066,269 A | | 5/2000 | Wei et al. | 252/500 |
| 6,245,881 B1 | * | 6/2001 | Faure et al. | 528/353 |
| 6,277,304 B1 | | 8/2001 | Wei et al. | 252/500 |
| 6,307,002 B1 | * | 10/2001 | Okada et al. | 528/170 |
| 6,350,845 B1 | * | 2/2002 | Okada et al. | 528/170 |
| 6,365,294 B1 | | 4/2002 | Pintauro et al. | 429/33 |
| 6,376,129 B1 | | 4/2002 | Faure et al. | 429/306 |
| 6,387,230 B1 | | 5/2002 | Murphy et al. | 204/296 |
| 6,425,944 B1 | * | 7/2002 | Faure et al. | 96/14 |
| 6,468,684 B1 | | 10/2002 | Chisholm et al. | 429/33 |
| 6,559,237 B1 | * | 5/2003 | Mao et al. | 525/326.2 |
| 6,596,838 B1 | * | 7/2003 | Pinery et al. | 528/170 |
| 2002/0091225 A1 | | 7/2002 | McGrath et al. | 528/170 |

OTHER PUBLICATIONS

Cornelius, Chris J. and Marand, Eva, "Hybrid Inorganic-Organic Materials based on a 6FDA-6FpDA-DABA Polyimide and Silica: Physical Characterization Studies", *Polymer* 43 (2002) pp. 2385-2400.

* cited by examiner

*Primary Examiner*—P. Hampton Hightower
(74) *Attorney, Agent, or Firm*—Robert D. Watson

(57) ABSTRACT

A new class of hybrid organic-inorganic materials, and methods of synthesis, that can be used as a proton exchange membrane in a direct methanol fuel cell. In contrast with Nafion® PEM materials, which have random sulfonation, the new class of materials have ordered sulfonation achieved through self-assembly of alternating polyimide segments of different molecular weights comprising, for example, highly sulfonated hydrophilic PDA-DASA polyimide segment alternating with an unsulfonated hydrophobic 6FDA-DAS polyimide segment. An inorganic phase, e.g., 0.5–5 wt % TEOS, can be incorporated in the sulfonated polyimide copolymer to further improve its properties. The new materials exhibit reduced swelling when exposed to water, increased thermal stability, and decreased $O_2$ and $H_2$ gas permeability, while retaining proton conductivities similar to Nafion®. These improved properties may allow direct methanol fuel cells to operate at higher temperatures and with higher efficiencies due to reduced methanol crossover.

40 Claims, 18 Drawing Sheets

PROTON EXCHANGE MEMBRANE MATERIALS FOR THE ADVANCEMENT OF DIRECT METHANOL FUEL-CELL TECHNOLOGY

CROSS-REFERENCE TO RELATED APPLICATIONS

This application claims the benefit of U.S. Provisional Patent Application Ser. No. 60/469,321, filed May 9, 2003, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to the synthesis of improved proton-exchange membrane (PEM) materials for use in fuel cells. More specifically, the invention relates to the synthesis of hybrid organic-inorganic PEM materials based on polyimide block copolymers that can be used in direct methanol fuel cells (DMFC).

In 1839 Grove discovered the first fuel cell by observing the production of electricity from organic chemicals using precious metal electrodes. However, it was not until the development of proton-exchange membrane (PEM) materials that fuel cells began to show their potential as a viable power source. Fuel cells directly convert chemical energy into electrical energy. Typical fuels such as hydrogen, methanol, and ethanol can be directly oxidized and reduced utilizing a Pt or PtRu catalyst to generate power. Unlike batteries, fuel cells can theoretically operate indefinitely by simply supply more fuel. The efficiency of fuel conversion to power is 40–60% for fuel cells, while current internal combustion engines are only 20–30% efficient. Furthermore, fuel cells based on $H_2$ as a feed source generate only water (no green house gases).

One application of the present invention is in the area of Direct Methanol Fuel Cell (DMFC) technology. A DMFC electrochemically converts methanol and oxygen into electrical energy by utilizing a Pt or PtRu catalyst. At the anode of a DMFC, methanol is catalytically oxidized into one mole of $CO_2$, six protons, and six electrons; while at the cathode $O_2$ is reduced in the presence of protons and electrons to yield $H_2O$. The electrons produced at the anode are used to do work in an outside circuit, and then recombined with oxygen and protons that diffuse from the anode through a solid electrically insulating electrolyte medium to the cathode to complete the electrochemical reaction. This entire electrochemical process has a theoretical cell voltage of 1.21 V at 25° C., which is schematically illustrated in FIG. 1. In order for the DMFC to operate, the separating electrolyte medium provides electrical insulation and high proton conductivity. This role is fulfilled by the PEM by separating these half-cell reactions in the fuel cell. The entire ensemble of anode, PEM, and cathode is known as a membrane electrode assembly (MEA).

Currently, the state of the art PEM material used in fuel cells is Nafion® (DuPont, United States). Nafion® is a polytetrafluoroethylene (PTFE) polymer that is polymerized in the presence of sulfonic acid containing fluorinated α-olefin. This type of chemistry leads to a random structure of Nafion®, which is schematically illustrated in FIG. 2 revealing its PTFE backbone and pendant sulfonic acid group. Nafion® has been demonstrated as an excellent PEM material, although its high material cost is a barrier for consideration in many practical proton-exchange membrane fuel cell (PEMFC) applications. Nafion® is almost exclusively used in Direct Hydrogen and Direct Methanol Fuel Cells (DHFC and DMFC) because of its excellent proton conductivity and chemical, electrochemical, and mechanical stability.

While Nafion® possesses excellent material properties, such as chemical inertness and high proton conductivity, Nafion® also has incredibly high methanol permeability. This high methanol permeability results in the unwanted diffusion of methanol from the anode to the cathode. Currently, DMFCs suffer from fuel cross over, which limits the concentration of methanol that can be fed to the fuel cell. This prevents the fuel cell from achieving higher current densities and power outputs due to poor utilization of the PtRu catalyst. Furthermore, increasing the methanol concentration in the feed would lead to increased utilization of the catalyst, which may lead to decreased catalyst loadings. Swelling of PEM materials when hydrated leads to decreased mechanical properties, and difficulty in integrating the PEM into a fuel cell stack without creating very thick films. Thicker PEM films results in more material utilization leading to more expensive fuel cell stacks, and increases the proton resistance, which leads to decreased fuel cell power output.

In order to compensate for methanol crossover, a dilute feed mixture of water and methanol is fed to the anode. The main problem with using a dilute methanol-water mixture is that it increases the activation overpotential at the anode. This anode overpotential impacts the overall fuel cell performance by reducing power output. Methanol crossover effects exhibit a trade-off relationship between conductivity and methanol permeability, as illustrated in FIG. 3 for several different types of PEM materials. Decreasing the rate of methanol crossover would allow the use of higher concentrations of methanol-water feed mixtures, which would increase catalyst efficiency, DMFC power output, and potentially fuel utilization.

DMFCs utilizing Nafion® to form the MEA are limited to a fuel cell operating temperature below or near 80° C. in order to maintain proper hydration of the PEM. Proper hydration of a Nafion® PEM is critical for good proton conductivity and overall fuel cell performance. Low temperatures are also required to maintain the material integrity of Nafion®, which is lost at temperatures near 100° C. This loss in material integrity is due to the hydrated state of Nafion® and its glass transition temperature ($T_g$) near 100° C. due to water plasticization. If the DMFC were operated at higher temperatures, enhanced diffusion rates and reaction kinetics for methanol oxidation, oxygen reduction, and water and $CO_2$ desorption could be realized, resulting in a more efficient fuel cell. Additionally, operating a DMFC near 150° C. would significantly retard CO catalyst poisoning, and improve fuel cell efficiency and performance. Therefore, the high cost of power associated with DMFC technology is partly due to the PEM material limitations.

The advancement of DMFC technology would benefit significantly by the development of novel PEM materials that enable higher DMFC power outputs by minimizing methanol diffusion across the PEM. PEM materials possessing this property could be made into thinner members, which would decrease ohmic losses and improve fuel cell performance. Currently, Nafion® is almost exclusively used as the PEM in a DMFC because of its excellent electrically insulating and high proton conductivity properties. However, Nafion® is very expensive, suffers from a high rate of methanol diffusion across the anode to cathode, and the aforementioned material limitations previously discussed. A technical challenge for DMFC technology is the engineering of cheaper PEM materials without sacrificing proton conductivity and chemical stability. Furthermore, lowering methanol crossover would increase the power output of the DMFC by increasing the kinetics by increasing the concentration of methanol in the feed, which in turn would improve the catalyst's efficiency.

Against this background, the present invention was developed.

SUMMARY OF THE INVENTION

The present invention relates to new class of hybrid organic-inorganic materials, and methods of synthesis, that can be used as a proton exchange membrane in a direct methanol fuel cell. In contrast with Nafion® PEM materials, which have random sulfonation, the new class of materials have ordered sulfonation achieved through self-assembly of alternating polyimide segments of different molecular weights comprising, for example, highly sulfonated hydrophilic PDA-DASA polyimide segment alternating with an unsulfonated hydrophobic 6FDA-DAS polyimide segment. An inorganic phase, e.g., 0.5–5 wt % TEOS, can be incorporated in the sulfonated polyimide copolymer to further improve its properties. The new materials exhibit reduced swelling when exposed to water, increased thermal stability, and decreased $O_2$ and $H_2$ gas permeability, while retaining proton conductivities similar to Nafion®. These improved properties may allow direct methanol fuel cells to operate at higher temperatures and with higher efficiencies due to reduced methanol crossover.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Improved PEM materials were successfully synthesized by utilizing Hybrid Inorganic-Organic Materials. Reductions in swelling, increased thermal stability, reduced $O_2$ and $H_2$ permeability, and increases in $T_g$ were observed for these materials. These property improvements were achieved with relatively small changes in proton conductivity, which will be discussed in the following sections.

Figure 1:
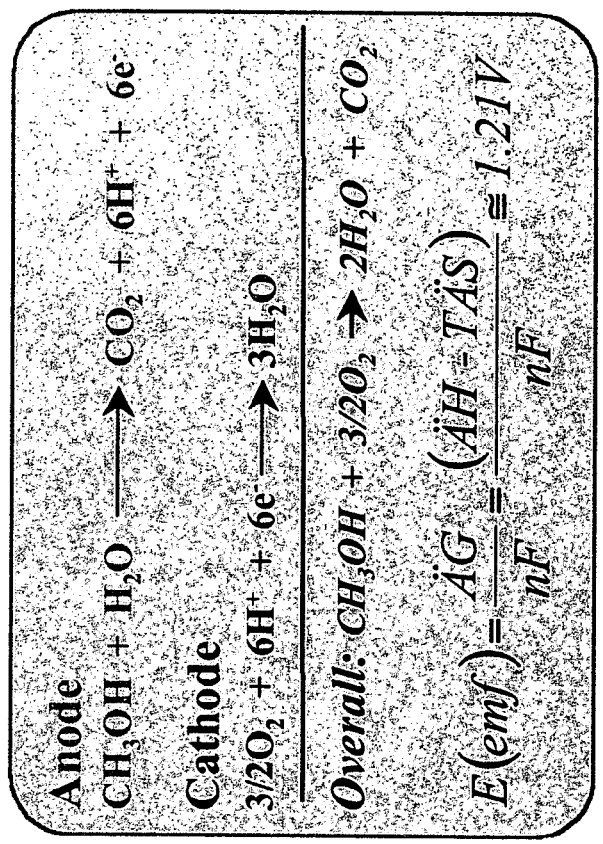
FIG. 1 shows a schematic representation of a membrane electrode assembly for a direct methanol fuel cell.
Figure 1:
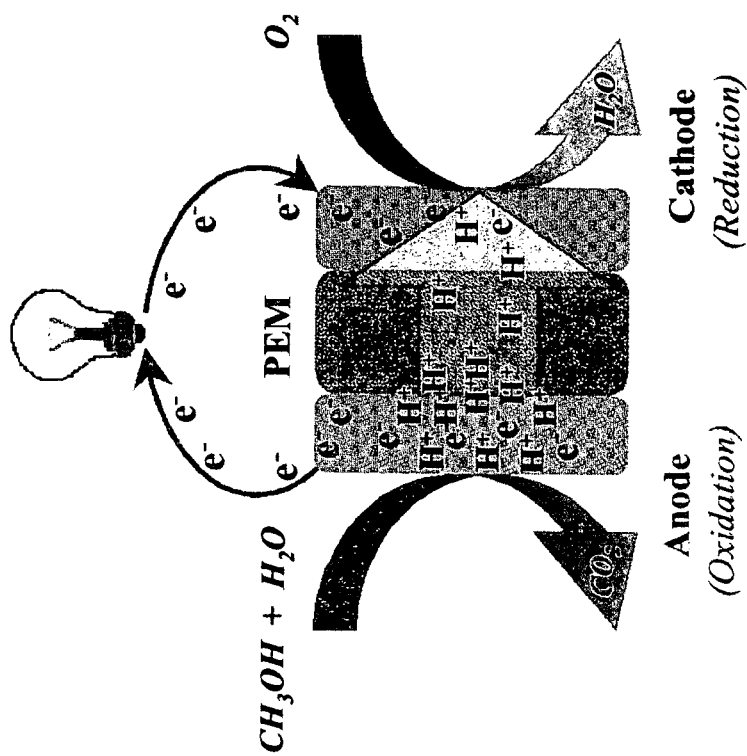
Figure 2:
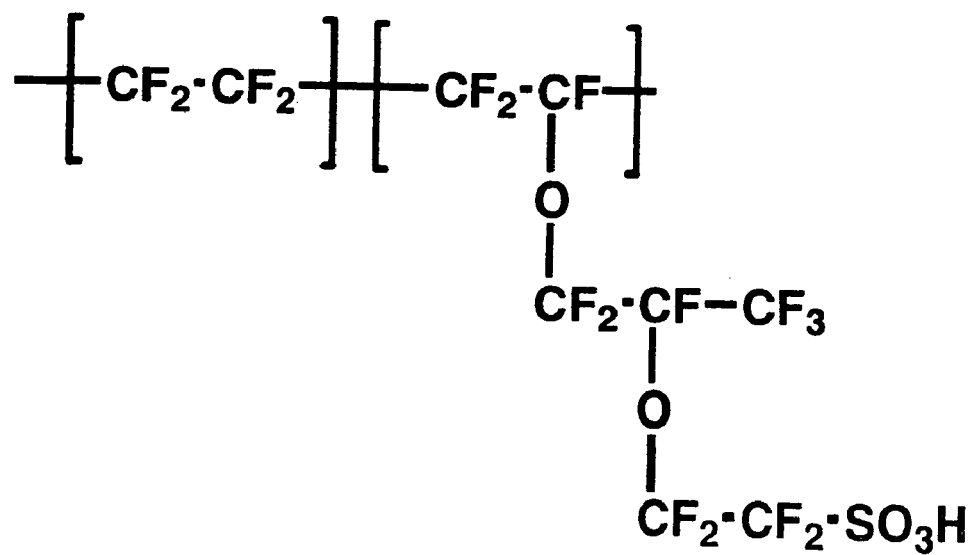
FIG. 2 shows a schematic representation of Nafion® containing a PTFE backbone with a fluorinated pendant side group containing a sulfonic acid moiety.
Figure 3:
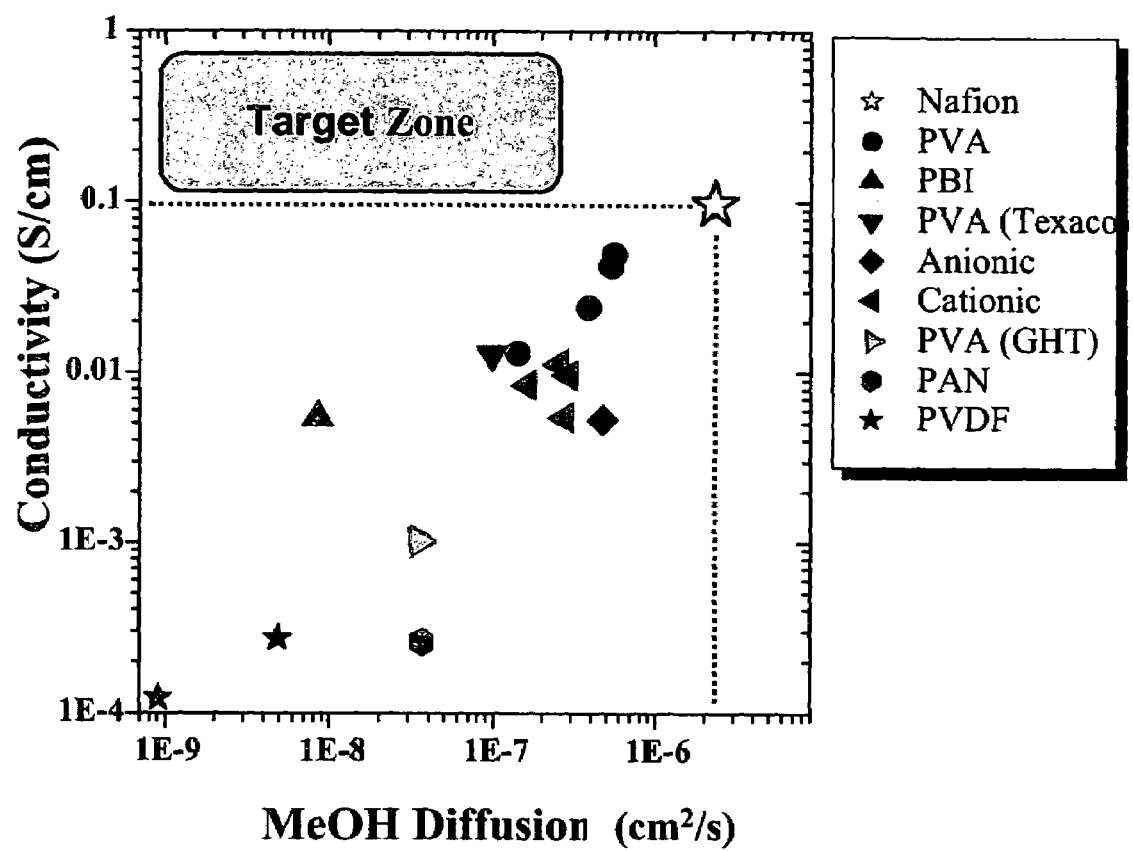
FIG. 3 Trade-off relationships between proton conductivity and $CH_3OH$ crossover.
Figure 4:
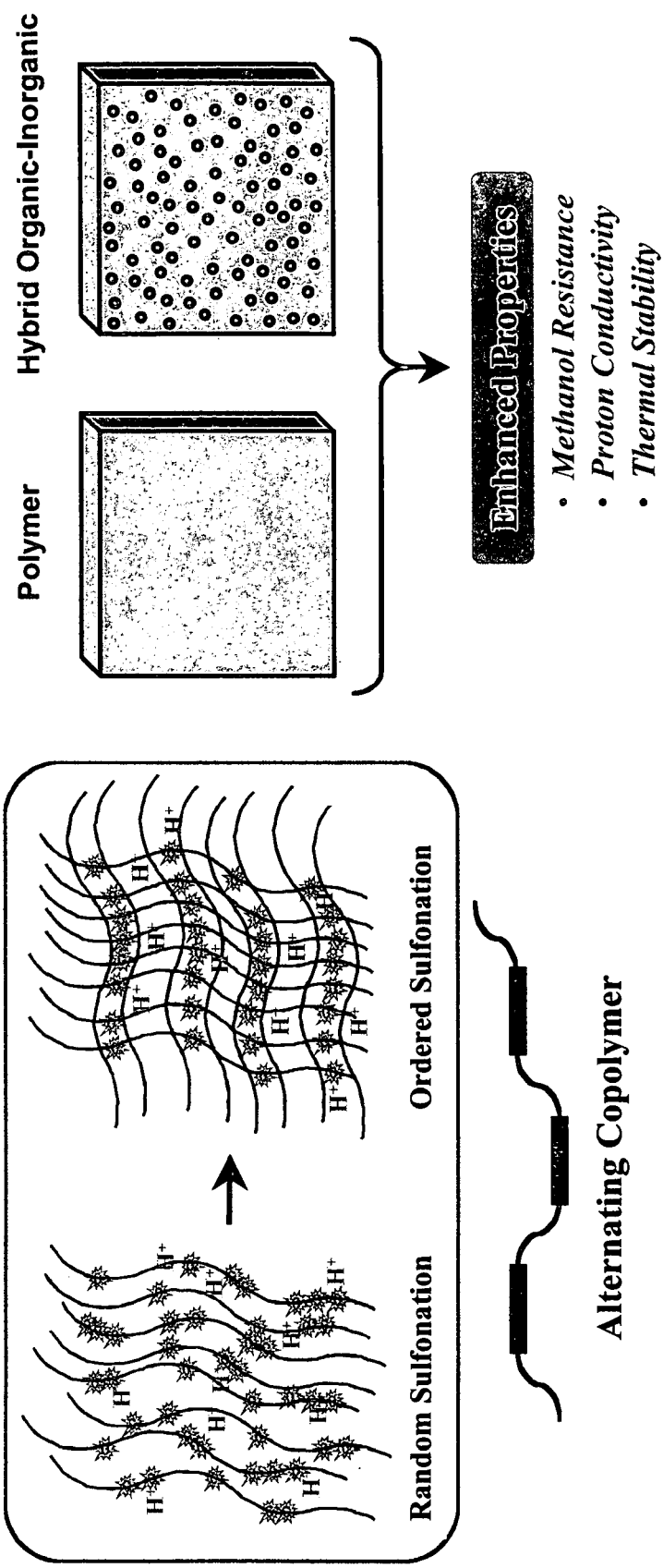
FIG. 4 Molecular engineering enhanced PEM properties for via alternating copolymers and hybrid organic-inorganic based PEM materials.

The technical approaches utilized in the development of this improved PEM materials relied upon the design of alternating copolymers that would interact synergistically with an inorganic phase in the final hybrid organic-inorganic PEM material. It is the synergy between polymer/ionomer matrix and inorganic domains that give rise to the enhanced PEM materials with lower swelling and methanol crossover, while simultaneously maintaining proton conductivity. Successful synthesis of the PEM hybrid organic-inorganic nanocomposite architecture began with the systematic control of the polymer morphology with alternating copolymers to optimize the proton conductivity. These alternating copolymers were created from controlled molecular weight segments in order to create self assembly of hydrophilic sulfonic acid domains to arrive at an ordered material versus a randomly sulfonated PEM material. Furthermore, the organic functionality of the PEM copolymer led to favorable synergy that was also observed by increased thermal stability. This technical approach is schematically represented in FIG. 4. In order to reduce the cost of these PEM materials, the choice of materials to create them was based on commercially available monomers. The improved PEM materials are more economical and superior to Nafion®.

These novel PEM materials reduce methanol crossover and reduce material swelling by reducing the segmental mobility of the polymer chains, and controlling the dispersion of the proton conducting domains in the PEM material. Ultimate control of the PEM material properties is achieved by controlling the molecular weight between each segment in an alternating PEM copolymer. Each segment in the copolymer serves several purposes. First, proton conductivity is controlled by sulfonic acid concentration, and controlled distribution throughout the copolymer morphology. Second, the molecular weight of each segment provides mechanical properties, cross-linking sites to minimize fuel cross over, minimize swelling, and control the final morphology of the PEM material. These physical properties are enhanced by in-situ polymerization of inorganic domains, which induces further restriction of the segmental mobility of the polymer chains. The final Hybrid Organic-Inorganic material can be described as a PEM nanocomposite that possesses enhanced mechanical properties over Nafion.

This technical approach is different from existing technology in three ways. First, systematic control of the PEM morphology is used to optimize the proton conductivity of the copolymer. Second, the functionality of the PEM copolymer is such that it will interact favorably with the inorganic domains, and the synergist properties that result are the optimized for this system. Finally, these materials will not strongly depend on fluorination to achieve proton conductivity. The result is a new class of PEM materials that are more economical and superior to Nafion.

PEM Polymer Synthesis

Figure 5:
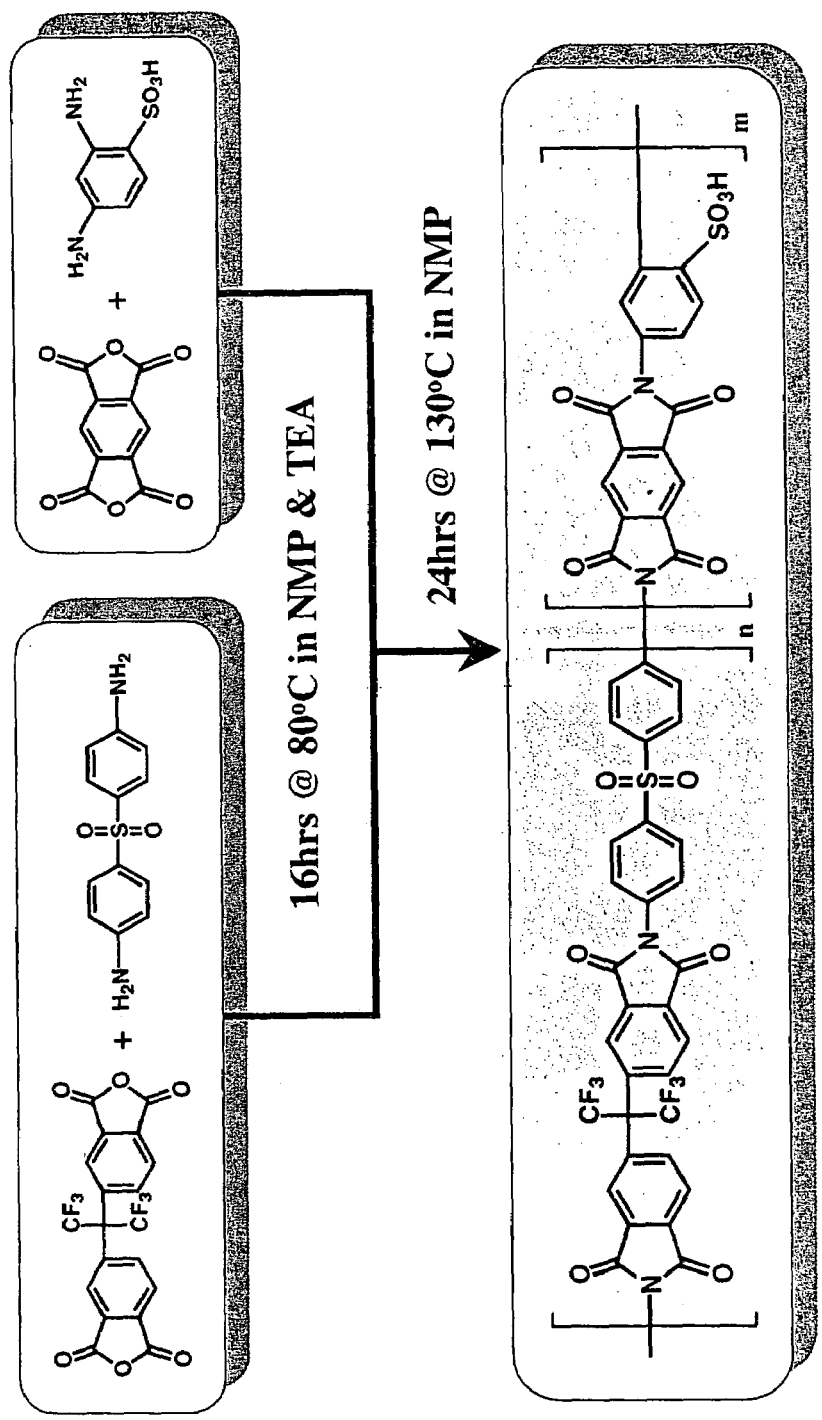
FIG. 5 Synthesis scheme for creating the 6FDA-DAS-PDA-DASA polyimide copolymers according to the present invention.

A series of alternating polyimides based upon 4,4'-hexafluorisopropylidenediphtalic anhydride (6FDA), 4,4'-diaminosulfone aniline (DAS), pyromellitic dianhydride (PDA), and 2,4-diaminobenzosulfonic acid (DASA) were synthesized utilizing the solution-imidization technique as illustrated in FIG. 5. These polymers are referred to as 6FDA-DAS-PDA-DASA polyimides, and are abbreviated as 6F20, 6F35, and 6F40 with the ending number representing the mol % of DASA in the final polyimide. The following section describes the general synthetic approach employed in making these 6FDA-DAS-PDA-DASA polyimide PEM materials.

A 15 wt % polymer solution containing a 4:1 molar ratio of 1-methyl-2-pyrrollidinone (NMP) and 1,3-dichlorobenzene (DCB) was targeted for the polymers synthesized utilizing the technique illustrated in FIG. 5. A stoichiometric amount of 6FDA and DAS were converted to a polyimide in the presence of a catalytic amount of triethylamine (TEA) upon reacting at 80° C. for 16 hours under a purging Ar atmosphere in a 250 ml round bottom flask. In a second 250 ml round bottom flask, a stoichiometric amount of PDA and DASA were added with a catalytic amount of TEA that was allowed to react at 80° C. for 16 hours. Carother's equation was used to control the final molecular weight of the polyimide by changing the reactants stoichiometry.

Figure 6:
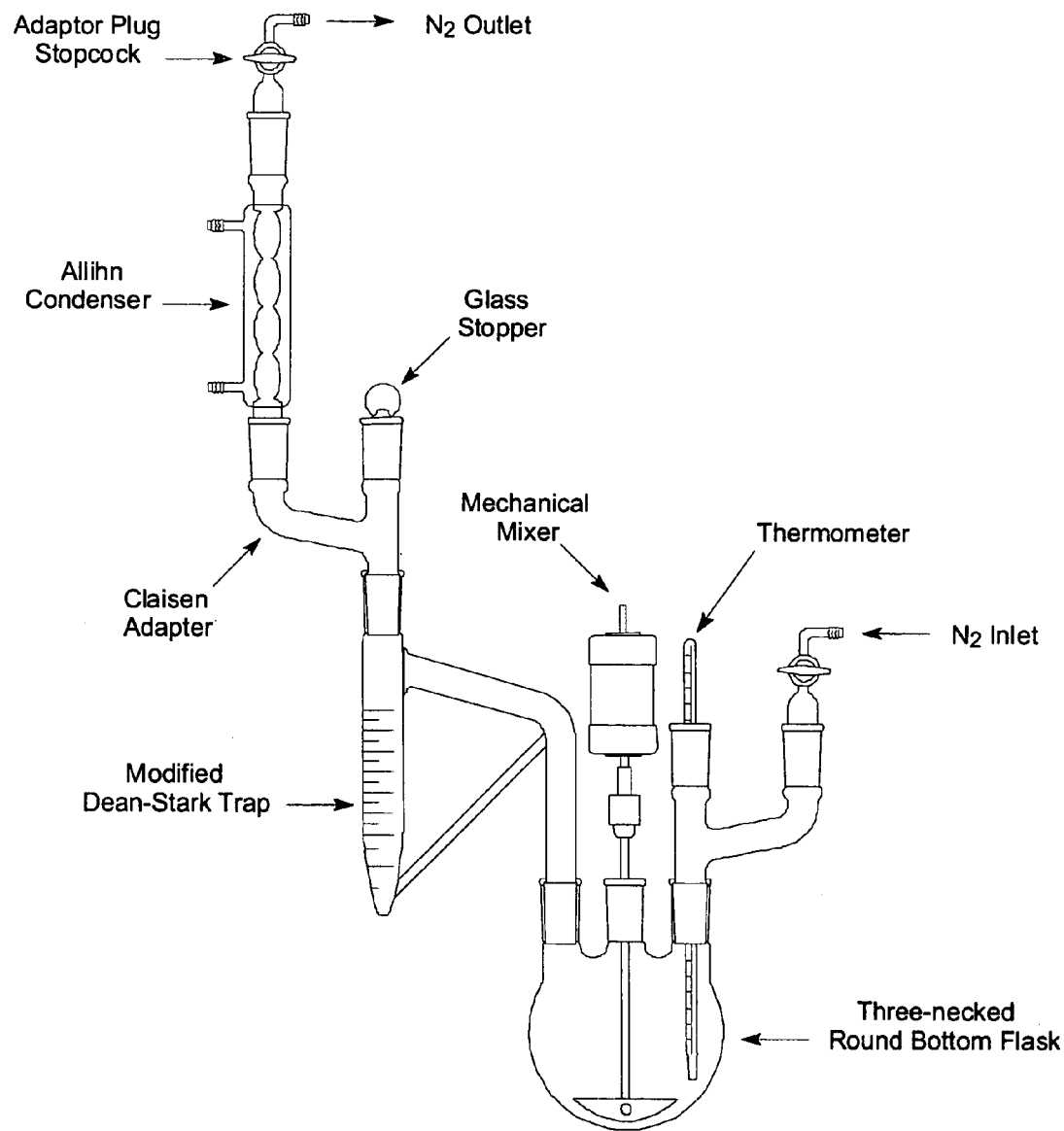
FIG. 6 Equipment set-up for the solution imidization technique for creating the 6FDA-DAS-PDA-DASA polyimide copolymers.

After the completion of these initial reactions, the two solutions of 6FDA-DAS and PDA-DASA were added to a 500 ml three-necked round bottom flask and allowed to react at 130° C. for 24 hours. An Ar atmosphere with continual purging was employed in all synthetic steps during the formation of the polyimide PEM materials. Water formed during cyclodehydration of the polyamic acid was removed by forming a low boiling point azeotrope with the DCB, which was distilled out of the reaction utilizing an Allhin condenser and a modified Dean-Stark trap as shown in FIG. 6.

A constant solvent volume was maintained during the reaction by replacing azeotroped DCB with new DCB via the modified Dean-Stark trap. At the end of the reaction, the final 6FDA-DAS-PDA-DASA polyimide PEM was allowed to cool to room temperature prior to filtering with a 0.8 µm nylon filter and precipitating into methanol. Films were cast from NMP on a hot plate at 60° C. followed by drying in a vacuum oven at 120° C. for 24 hours.

Figure 7:
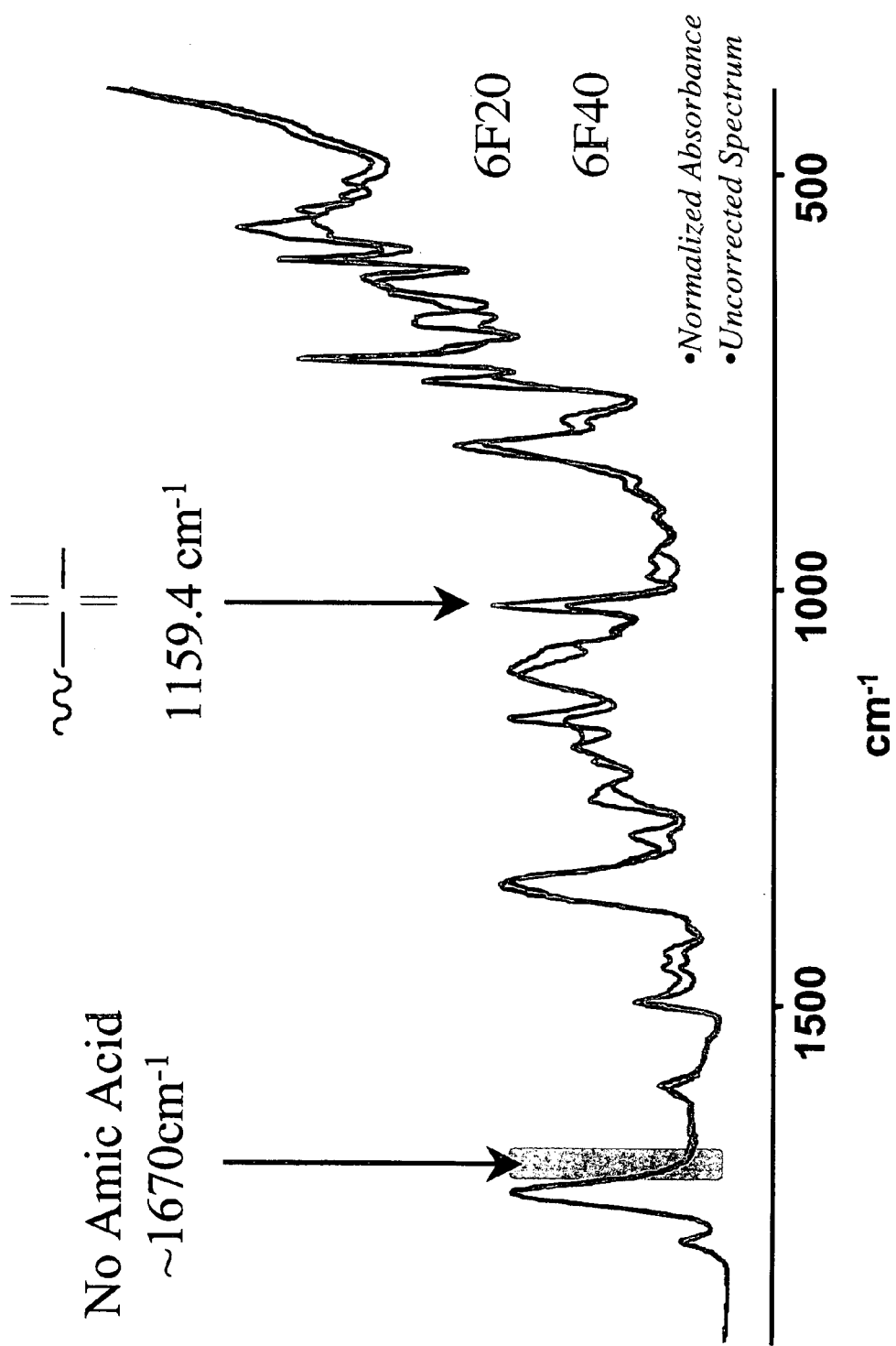
FIG. 7 Normalized FTIR-ATR spectra of 6F20 and 6F40 copolymers showing complete imidization of polyimide.

A BIO-RAD FTS-40A was used to collect Fourier Transformation Infrared Spectroscopy spectra via Attenuated Total Reflectance (FTIR-ATR) to evaluate the imidization process. The FTIR instrument was equipped with a high sensitivity liquid nitrogen cooled MCT detector, and the entire instrument was continuously purged with dry air during the collection of all spectra. A wave number resolution of 4 cm$^{-1}$ was used during the collection of spectra with an open aperture. The spectra was collected with a crystal Thallium Bromoiodide Single-Pass Parallelepiped (KRS-5 SPP) with dimensions of 50 mm×10 mm×3 mm. Based upon the crystal dimensions and an angle of incidence of 45°, the IR beam internally reflected on the surface of the film approximately 18 times before emerging from the end of the crystal face. The imidization reactions leading to the alternating copolymer polyimide PEM were considered quantitatively complete by the disappearance of the polyamic acid peak at ~1670 cm$^{-1}$. FIG. 7 is the normalized absorbance spectra of 6F20 and 6F40 polyimide PEM materials. The spectra show the absence of the polyamic acid peak and the presence of the sulfonic acid peak at 1159 cm$^{-1}$, which quantitatively illustrates the higher sulfonic acid content in the 6F40 polyimide.

Hybrid Organic-Inorganic Synthesis

Figure 8:
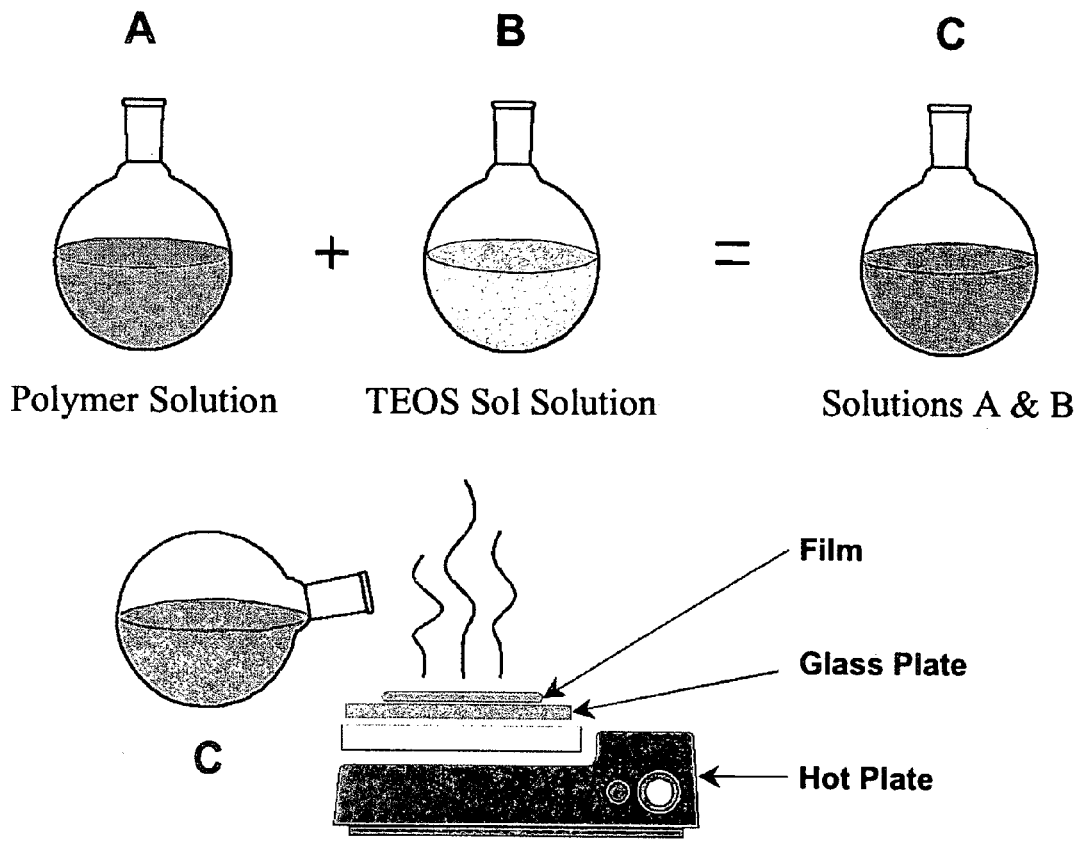
FIG. 8 Solution casting approach for creating Hybrid Organic-Inorganic PEM thin films.

Hybrid organic-inorganic materials were successfully synthesized employing the generalized synthetic approach as illustrated in FIG. 8. This approach involves creating predetermined solutions of a polymer solution A, and an acid catalyzed sol solution B from TEOS. The partially hydrolyzed TEOS solution B was generated using a molar ratio of 1:3.8:9.8:0.01 of TEOS, ethanol, water, and 1.0 M HCl. TEOS and ethanol were added to a 250 ml round bottom flask and stirred until homogeneous. Acid and water were then added with stirring to the mixture, which was then allowed to reflux at 50° C. for 24 hours. The resulting sol solution was clear and stored at −25° C. when not being used. A 15 wt % solution of 6FDA-DAS-PDA-DASA polyimide and NMP was targeted for solution A. Solutions A and B were mixed together until homogeneous to yield solution C. Solution C was cast upon a glass plate that was heated to 60° C. using a hot plate in order to remove the excess solvent. The resulting film was then placed into a vacuum oven at 150° C. for 24 hours. Non-hybrid films were also cast in a similar fashion to give rise to tough creasable films. All films generated by this technique had an average thickness of 2.5 mil or 63.5 µm, which was used to evaluate their physical properties.

Morphology

The following hybrid organic-inorganic morphology study, although qualitative in nature, reveals the importance in inorganic incorporation technique as well as the role of degree of sulfonation on compatibilization. However, these results do illustrate the interdependence of techniques and its impact on morphology. Although not a part of this study, further material enhancements and inorganic-organic compatibilization should be achievable by covalently bonding the inorganic domains to the polymer matrix.

PEM Polymer Morphology

The polymer morphologies of 6F20, 6F40, and Nafion® 117 were evaluated utilizing atomic force microscopy in the tapping mode (AFM-TM) to collect height and phase images. A general rule of thumb associated with AFM-TM phase images is that "softer" domains appear darker than the "harder" domains, and the relative difference in "hard" and "soft" is dependent on the magnitude of the shift in the phase angle or degree. However, it should be noted that the AFM-TM phase images are a product of the viscoelastic properties of the material, coulombic forces, experimental conditions, and the instrument set-up employed while collecting an image. In order to discuss the subtle differences and their potential impact on the PEM properties, it is important to discuss the morphology of Nafion prior to discussing the polyimide systems. The following is a summary of the results from the study of their morphologies.

As previously discussed, Nafion has excellent proton conductivity that is partly due to the bicontinuous nature of the hydrophilic and hydrophobic domains. In the AFM-TM phase images, the soft domains represent the hydrophilic domains that contain the sulfonic acid moieties and the hard domains represent the hydrophobic domains. In order for a potential PEM material to be a good proton conductor, a bicontinuous system may be necessary. In order to investigate this concept, alternating copolymers with different molecular weights between each segment were synthesized. These different PEM materials are represented by the 6F20 and 6F40 polyimides.

The morphology of the 6F20 alternating PEM copolymer and its corresponding morphology was studied. As with Nafion, the soft domains contain the sulfonic acid groups, which is also the proton conductive carrying domains. In this polymer system, a number average molecular weight ($\overline{M_n}$) of 10 K was targeted for the 6FDA-DAS and PDA-DASA molecular weight segments. The impact of this change in molecular weight is represented in all the AFM-TM phase images. The morphology of 6F20 has pronounced phase separation that is attributed to self-assembly of sulfonic acid containing molecular weight segments. This self-assembly has long-range order throughout the polymer system with parallel soft and hard segments running throughout the copolymer. The hard domains are fibrous while the softer domains are mottled mixtures of soft and hard domains, which appear to be bicontinuous. Overall, this block copolymer appears to be characterized by three different domains. It is also apparent that the hard domains are composed of fibrous polymer domains that also contain very soft proton conductive domains. It is postulated that these domains represent highly sulfonated PDA-DASA polyimide regions represented by the dark regions; lighter regions represent the unsulfonated hydrophobic 6FDA-DAS polyimide domains, and medium-dark regions represent a blend of 6FDA-DAS and PDA-DASA polymer chains. In order to validate this idea, further characterization work is necessary. However, the AFM images demonstrate a significant degree of self-assembly, or phase separation in the PEM copolymer domains that also has long-range order of soft and hard polymer segments. This phase separation, or self-assembly, is attributed to the large molecular weight difference between each segment, and is thought to be partly responsible for the better hydrolytic stability observed in these materials. In order to appreciate the impact of molecular weight on the PEM morphology, the 6F40 PEM copolymer morphology is presented.

The morphology of the 6F40 alternating PEM copolymer, and its corresponding morphology was studied using AFM-TM phase images. In this polymer system, a $\overline{M_n}$ of 2K was targeted for the 6FDA-DAS and PDA-DASA molecular weight segments. The morphology of 6F40 system is characterized by what appears to be two relatively homogeneous domains that are parallel to one another. While each domain lacks significant contrast in the phase images, the height images reveal differences in height. These differences in height are attributed to the sulfonated domains swelling within the matrix of the polyimide. As a result of swelling by hydrogen-bonded water, these domains are higher than the polymer bulk. In contrast to the 6F20 copolymer, the AFM images demonstrate a significant degree of homogeneity for the 6F40 copolymers. Although there appears to be some level of self-assembly, this could be an artifact of the technique and further analytical work is necessary to validate the morphology for the 6F40 copolymer. The homogeneity of this system is attributed to the small molecular weight difference between each segment. However, unlike the increased hydrolytic stability observed in the 6F20 system, the hydrolytic stability decreased considerably for the 6F40 system. The decrease in the hydrolytic stability in the 6F40 copolymer is attributed to this higher level of homogeneity, which is thought to lack significant hydrophobic domains that can reinforce the material in the hydrated state.

The implications of the morphology and its relationship to molecular weight and final physical properties of the PEM material are significant. Because the morphology observed with AFM are from the surface of the films, additional characterization work is warranted to validate if this morphology persists throughout the bulk of the film. However, the ability to systematically change the morphology of these PEM materials affords an opportunity not available to Nafion. As eluded to in this section, hydrolytic stability is one polymer physical property that can be changed by creating these alternating polyimide copolymers. It may be possible to use this morphology to create PEM materials that significantly reduce methanol crossover while not sacrificing proton conductivity.

Hybrid Organic-Inorganic PEM Morphology

The morphology of the hybrid organic-inorganic PEM materials was studied by scanning electron microscopy (SEM). Inorganic content, incorporation technique, and degree of sulfonation were examined in this study. These variables are important to the final hybrid materials morphology. A 6F20 PEM hybrid organic-inorganic material containing 0.5, 2.0, and 5.0 wt % TEOS that was formed in-situ was studied using SEM. The TEOS silica structures are 1–2 μm in diameter, oval-disk shaped, increase in concentration with increasing TEOS, appear to be evenly distributed throughout the polymer matrix, and the inorganic domains appear as light domains in the darker polymer matrix. There is little evidence that the inorganic domains are covalently bonded to the polymer matrix because it was seen that several disk shaped inorganic domains have fallen out of the matrix. The 6F20 hybrid organic-inorganic material is considered a microcomposite rather than a nanocomposite based on these SEM images.

6F40 PEM hybrid organic-inorganic material containing 0.5, 2.0, and 5.0 wt % TEOS that was formed in-situ was studied using SEM. In contrast to the 6F20 hybrid materials, the TEOS silica structures are sub micron in size, but still appear to increase in concentration with increasing TEOS content. As with the 6F20 hybrid materials, the inorganic domains appear to be evenly distributed throughout the polymer matrix, and free of any apparent porosity. The 6F40 hybrid organic-inorganic material is considered a nanocomposite based on the SEM images. The SEM images also showed that no inorganic domains have fallen out of the polymer matrix. It is thought that the higher sulfonic acid content has helped stabilize the inorganic domains, and contributed to the finely dispersed inorganic domains throughout the polymer matrix. This fine dispersion was not seen in the 6F20 hybrid materials, which suggests that the degree of sulfonation is very important in compatibilization of organic and inorganic domains. The unusual fracture behavior for these cross-sectional SEM images is thought to be an artifact of the fracture technique, but it is recognized that further work should be done to elucidate this failure mechanism and corresponding morphology.

Imbibing with TEOS was the final technique used to visualize the impact on morphology of the 6F20 and 6F40 polyimide hybrid organic-inorganic materials. The technique used to create this type of hybrid organic-inorganic material involved the equilibration of the polyimide in the prehydrolzyed sol solution described earlier that was diluted to twice its volume in ethanol. Polymer samples were placed in the diluted TEOS sol solution for 24 hours at 25° C. and allowed to equilibrate. After the prescribed imbibing time, the samples were removed from the solution, blotted dry, and allowed to dry. The resulting films were then placed in a vacuum oven at 160° C. for 4 hours and then removed for testing. Inorganic content was qualitatively determined from density measurements, which revealed a TEOS content of 1.29 wt % and 1.64 wt % for the 6F20 and 6F40 polyimide hybrid organic-inorganic materials, respectively. SEM cross-sections of the 6F20 and 6F40 PEM hybrid organic-inorganic materials were studied. In contrast to the 6F20 and 6F40 systems relying on in-situ techniques to incorporate TEOS into the polymer matrix, the imbibing technique for both hybrid materials created homogeneous composite materials as determined by SEM. The impact of this morphology on the physical properties of the final PEM hybrid organic-inorganic composite material is the discussion of the remainder of this report. However, it is relevant to mention that higher inorganic loadings are possible with this technique by changing the imbibing sol solution concentration. The SEM images also reveal that the fracture mechanism for the 6F20 hybrid material is very different from the 6F40 hybrid material. As with the previous systems, it is speculated that the higher sulfonic acid content leads to enhanced stabilization of the inorganic domains. However, as with all these hybrid organic-inorganic systems, TEM or some other analytical technique should be used to elucidate the composite morphology in these complex materials.

PEM Material Density

Density measurement data were based on Archimede's Principle utilizing a Mettler AJ100 analytical balance fitted with a Mettler ME-33360 density determination kit. The Archimede principle is based on the fact that when a solid body is immersed in a liquid it displaces an equivalent mass of liquid. This displaced liquid mass is determined indirectly utilizing this kit, and allows one to calculate the density of the unknown sample based on the difference on its mass when measured in air and a liquid. Equation 1 gives the relationship between predicted density, sample mass, and liquid density. In this equation, the predicted density of the polymer film is represented by $\rho_{film}$, the masses of the films measured in air and liquid are $m_{air}$ and $m_{liquid}$, and the density of the liquid is $\rho_{liquid}$. Octane was employed as the liquid medium and was chosen for these measurements because the polymers were not soluble in it, the solvent has a low surface energy that aided in wetting film samples, and the liquid has a low vapor pressure and negligible toxicity. Prior to making density measurements, films were dried for 24 hours at 120° C. in a vacuum. The reproducibility in measuring density based on this technique was found to be 0.5% or 0.004 g/ml. The following section discusses the results of the density measurements.

$$\rho_{film} = \frac{m_{air}}{m_{air} - m_{liquid}} \cdot \rho_{liquid} \quad (1)$$

Figure 9:
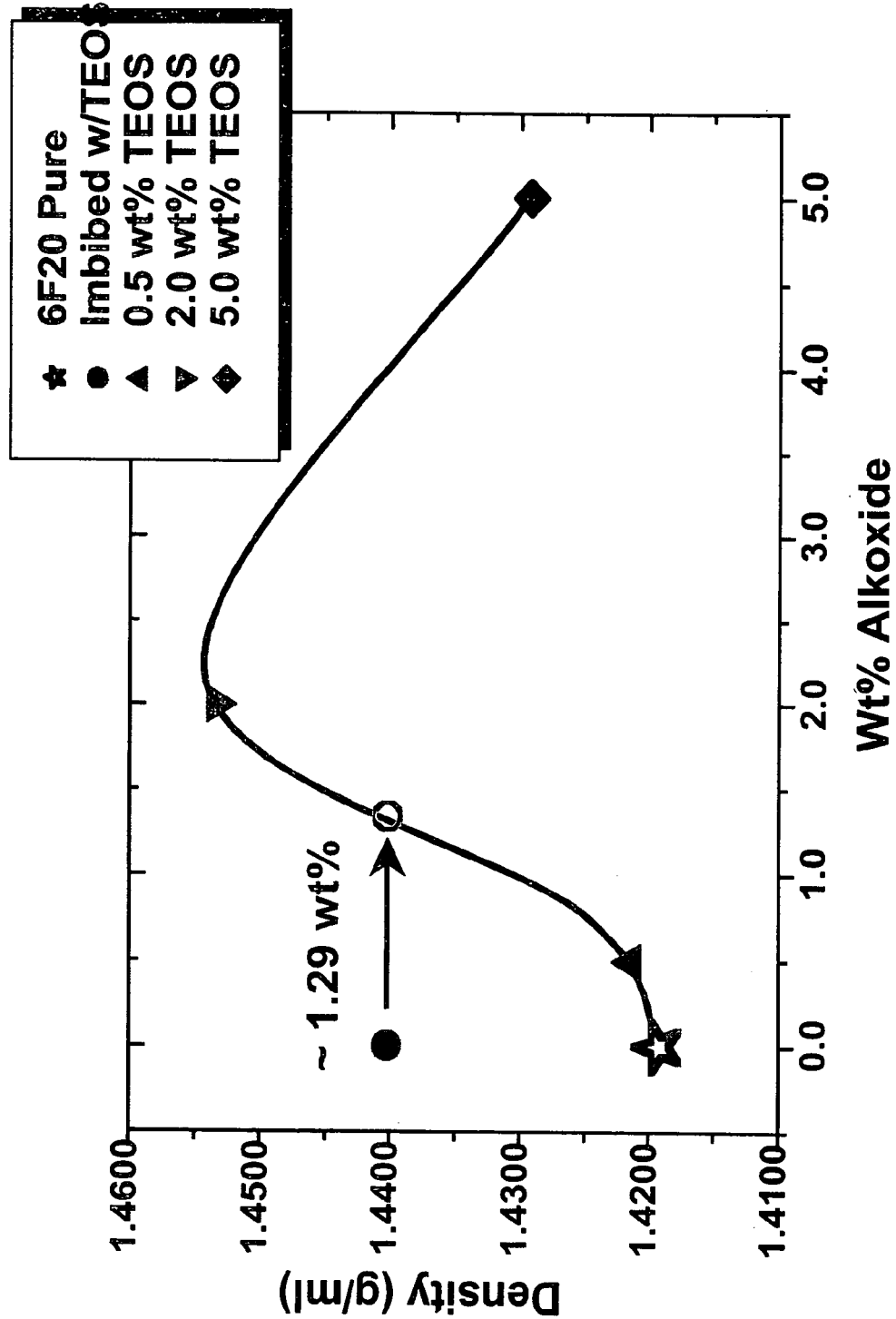
FIG. 9 Density of 6F20 hybrid materials and predicted TEOS loading in imbibed material.

The densities of the 6F20 hybrid organic-inorganic PEM materials are shown FIG. 9. Based on this figure and the density of the imbibed material, the total inorganic content was extrapolated to a value of 1.29 wt % TEOS. This assumption is realistic because it is expected that the density behavior of the imbibed samples should follow the same trend as the other TEOS loaded hybrid materials. An interesting feature shown in FIG. 9 is that a maximum density in the 6F20 sample occurs near 2.0 wt % TEOS, and then begins to decrease with increasing inorganic content. This increase in density is attributed to a loss in total fractional free volume in the polymer material, which also manifests itself as a reduction in the total permeability of the hybrid material. The maximum in density observed in this material is thought to be a consequence of the competing effects of a particle-filled system and the reduction in free volume.

Figure 10:
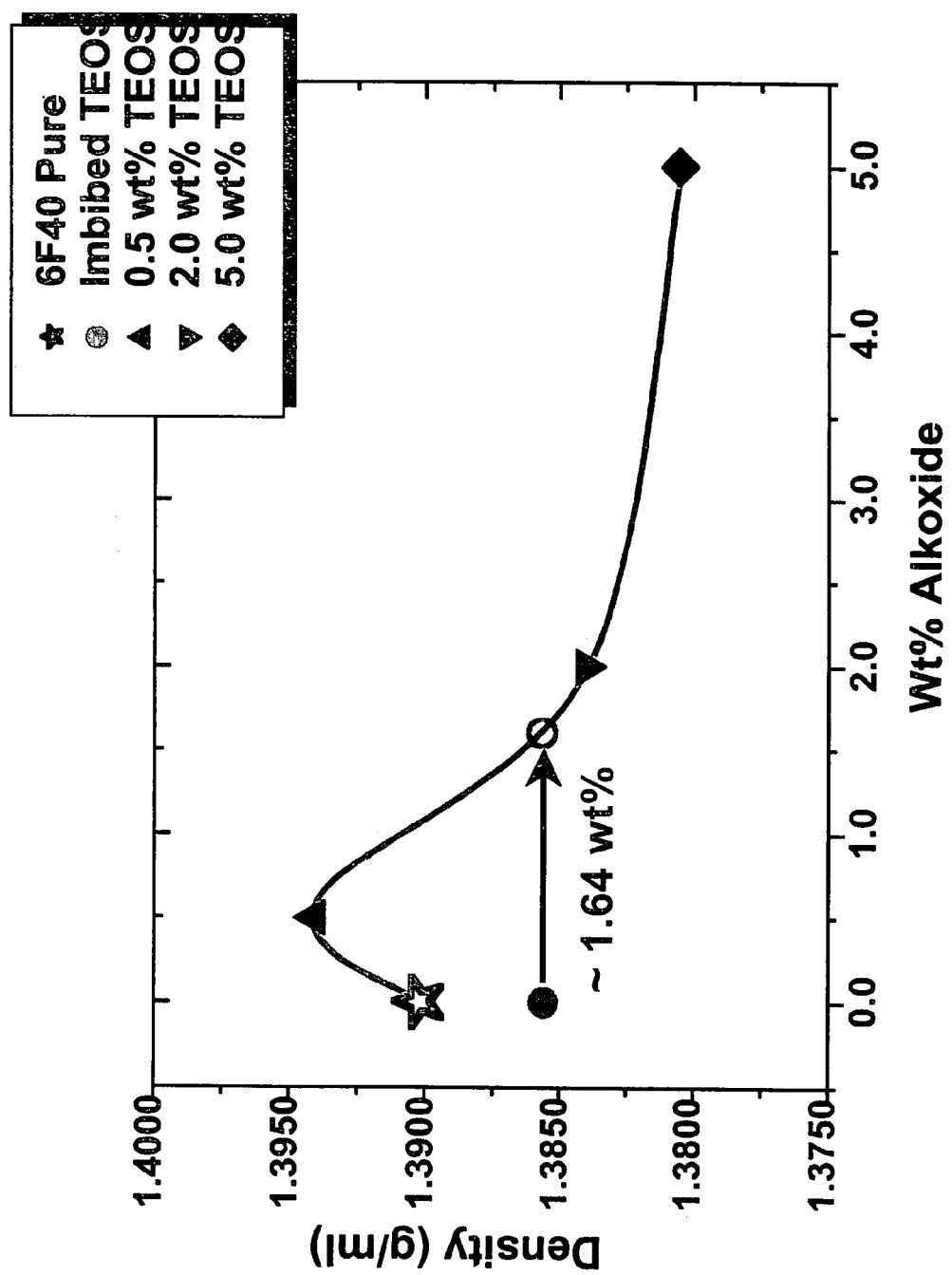
FIG. 10 Density of 6F40 hybrid materials and predicted TEOS loading in imbibed material.

The densities of the 6F40 hybrid organic-inorganic PEM materials and the predicted inorganic content based on the density of the imbibed material are shown FIG. 10. An inorganic content of 1.64 wt % TEOS was extrapolated for the 6F40 imbibed sample invoking the same assumptions as outlined for the 6F20 imbibed material. As noted for the 6F20 hybrid organic-inorganic materials, a maximum density was observed for these hybrids. However, the maximum for the 6F40 system appears to occur at 0.5 wt % TEOS, while the maximum for the 6F20 system was near 5.0 wt % TEOS. The appearance of the maximum at a lower inorganic loading is attributed to better inorganic dispersion throughout the polymer matrix. This is clearly visible in the composite morphology of the 6F40 hybrid material. The implication of this "better dispersion" is that the free volume elements, which contribute to the total fractional free volume in the polymer system, were modified much more quickly due to better mixing of inorganic and organic domains. The increase in density in the 6F40 hybrid organic-inorganic material is attributed to the total loss in total fractional free volume. This loss in free volume was observed by a reduction in the gas permeability of the hybrid material.

The maximum in density observed for these hybrid materials is thought to be the competing effects of a particle filled system and the reduction in free volume. What is thought to occur in these systems is the initial filling of the available free volume elements that leads to an increase in density. While this is occurring, the particle filled effect could be disrupting the interchain interactions leading to a loss in density. Thus, as the inorganic content is increased, the particle effect will dominate the bulk density measurement due to the limited concentration of free volume in the polymer system. In order to fully investigate the changes in free volume for these PEM hybrid organic-inorganic systems, positron annihilation lifetime spectroscopy (PALS) could be used in a future study.

Gas Transport Measurements

Gas permeation data for all the materials studied were collected employing the constant volume integral technique. This technique relates the increase in pressure with time in conjunction with the Time-Lag Method to measure the effective quantities for permeability, P, diffusion, D, and sorption coefficients, S, of these materials. The gas transport properties for the series of hybrid inorganic-organic materials were evaluated from dry thin films having a nominal thickness of 2.5 mil or 63.5 μm. A typical gas permeation test was initiated after degassing the system equipment and film to a system pressure of 1–5 mtorr. Additionally, the entire permeation equipment was allowed to reach thermal equilibrium prior to testing. Gases employed in this study included He, $O_2$, $N_2$, $CO_2$, and $CH_4$, which were all 99.999% pure. An absolute feed pressure of 4 atm was used in all permeation tests at 35° C. The reproducibility in measuring P was accessed to be 0.2% with a total error of 2%.

Figure 11:
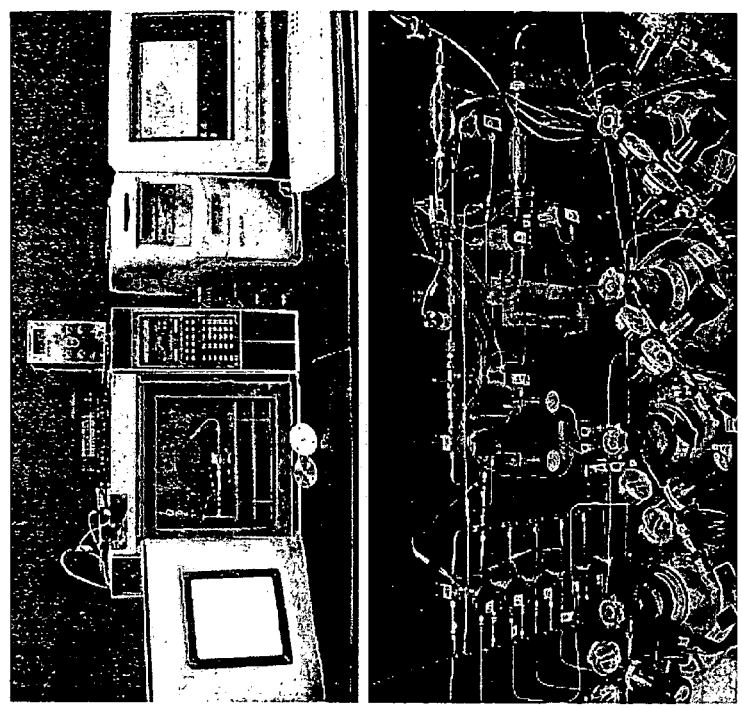
FIG. 11 Gas Transport Equipment for measuring ideal permeability.
Figure 11:
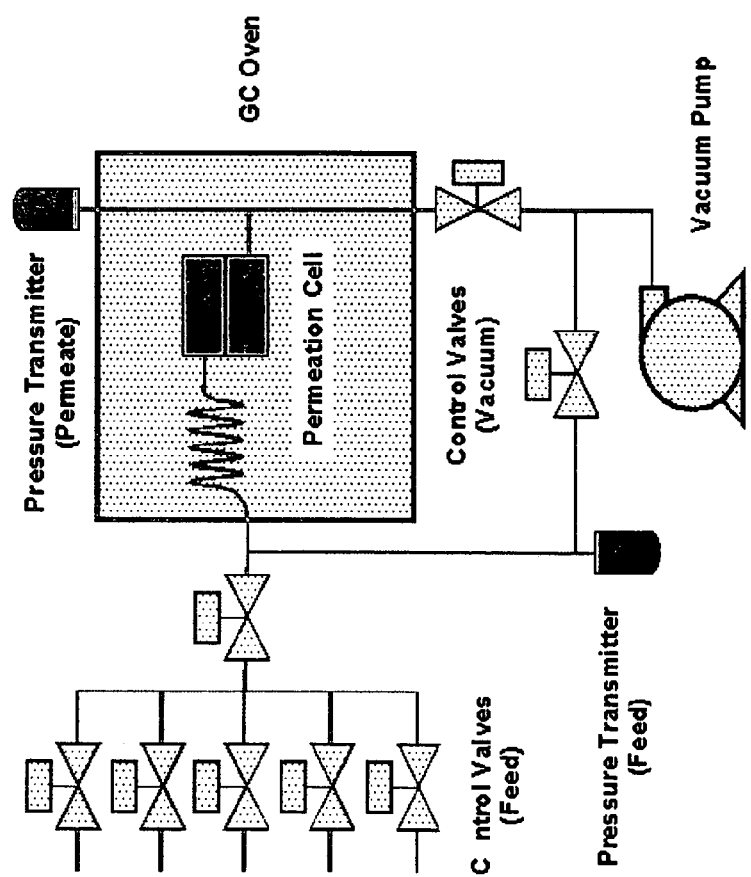

The equipment employed in gas permeation measurements is shown in FIG. 11. All gas lines were either 0.25" or 0.125" OD 316 stainless steel tubing. A HP5360 Series gas chromatograph oven was used to control the temperature of gas permeation process within 0.1° C. The temperature of the gas transport study was monitored and recorded with a type K thermocouple. A series of pneumatic block valves and a Pentium III computer were used to control the introduction of different feed gases, degassing of the film and equipment, and protection of the pressure transmitter for the permeate section.

The permeate pressure was measured with an absolute pressure transducer from MKS Baratron that has an operating range of 0–100 torr and a resolution of 0.1% of full-scale. The feed pressure was controlled with an electronic pressure regulator and the pressure measured with a MKS absolute pressure transducer from MKS with an operating range of 0–1000 psia. Degassing the gas permeation system was achieved with a two-stage vane vacuum pump from Alcatel Corp. rated for a vacuum of 1 mtorr. An external vacuum gauge was attached to the equipment set-up to monitor the degassing process.

Figure 12:
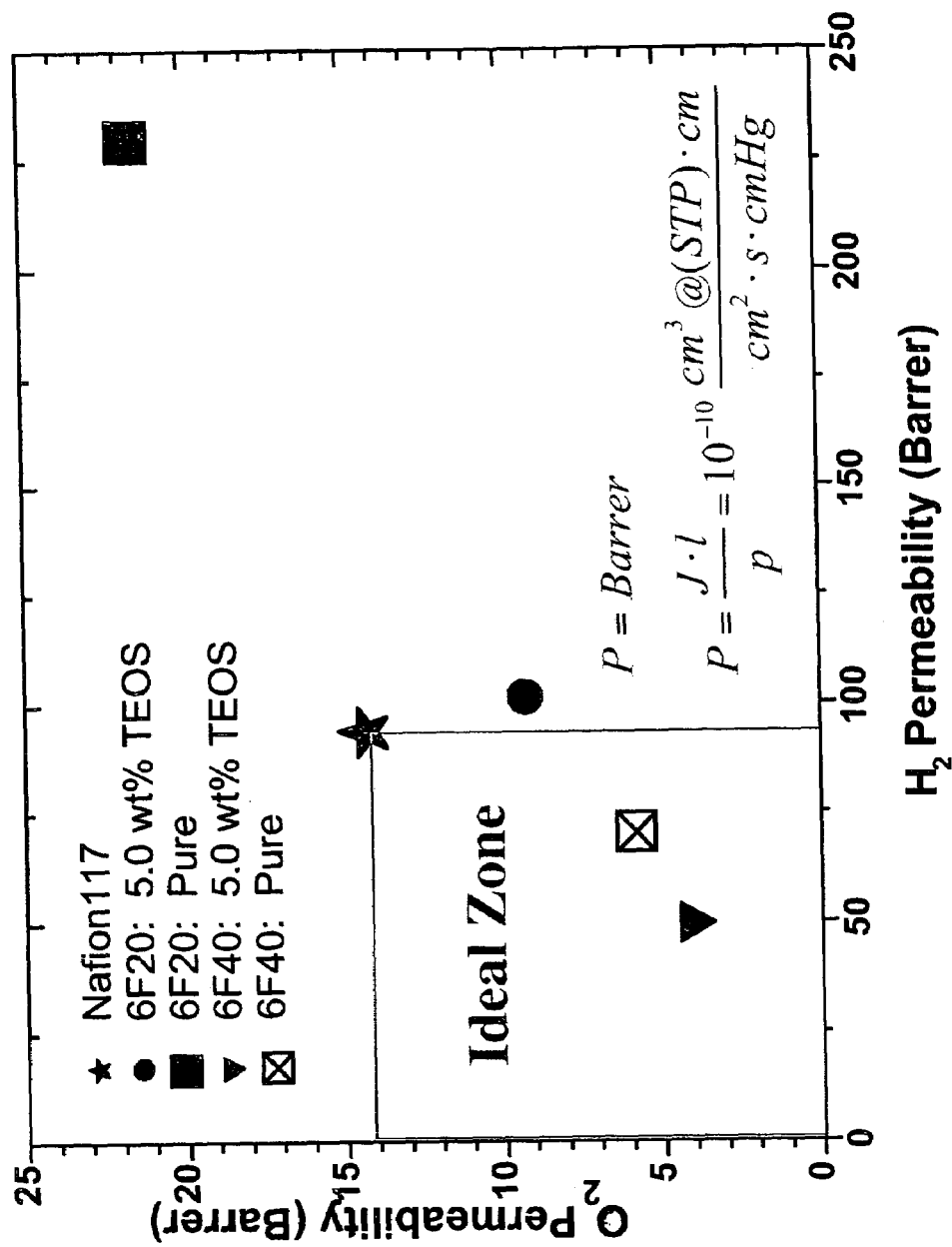
FIG. 12 Reduced $O_2$ and $H_2$ permeability of 6F20 and 6F40 hybrid materials and Nafion 117.

The gas transport results collected for some of these materials are shown in FIG. 12. FIG. 12 is a plot of the permeability of $O_2$ versus $H_2$ of these hybrid organic-inorganic materials relative to Nafion®, which also identifies an "Ideal Zone" of low permeability that is significant in $H_2$-air PEMFCs. The results from this figure indicate a remarkable improvement in the barrier properties of these polyimide-based PEM materials relative to $O_2$ and $H_2$ permeability. The 6F20 material has an $O_2$ and $H_2$ permeability that are 146% and 51% more permeable than Nafion®. When 5.0 wt % TEOS was added to the 6F20 hybrid material, the $O_2$ and $H_2$ permeability become 8% and 35% less permeable than Nafion®. This represented a total reduction in $O_2$ and $H_2$ permeability for the 6F20 material of approximately 56%. The permeability of the 6F40 material was 24% and 58% less permeable than Nafion for $O_2$ and $H_2$ permeability, respectively. The addition of 5.0 wt % TEOS resulted in an additional decrease in the $O_2$ and $H_2$ permeability by 47% and 71% relative to Nafion. The total reduction in $O_2$ and $H_2$ permeability for the 6F40 material is approximately 30%. The results from this study indicate that it is possible to minimize overpotential losses due to $O_2$ and $H_2$ crossover based on hybrid organic-inorganic PEM materials. Although not a part of this ideal study, future work regarding gas transport in PEM material should be completed at environmental conditions of an operating fuel cell to fully characterize the effect of water plasticization and gas transport.

Water Absorption Characteristics

Swelling experiments were performed on series of hybrid organic-inorganic materials based upon 6F20 and 6F40 polyimides and compared to Nafion® 117. Films having a nominal thickness of 2.5 mil and an average mass of 100 mg to 180 mg were used to assess the degree of swelling, as defined in Equation 2. In this equation, the wt % Swelling is represented by the percent difference in the final mass of a water swollen film, $m_{Final(wet)}$, and the initial mass of the dry film, $m_{Initial(dry)}$. Swelling was considered complete after immersing the samples in deionized water at 25° C. and allowing them to equilibrate for 24 hours. At the end of this swelling experiment, the swollen polymer film samples were quickly removed from the water, lightly blotted to remove water from the surface of the film, and then immediately weighed to determine the mass of the swollen film. The reproducibility in measuring the amount of water absorbed was found to be 7% for this particular technique.

$$\text{wt \% Swelling} = \frac{m_{Final(wet)} - m_{Initial(dry)}}{m_{Initial(dry)}} \cdot 100\% \quad (2)$$

Figure 13:
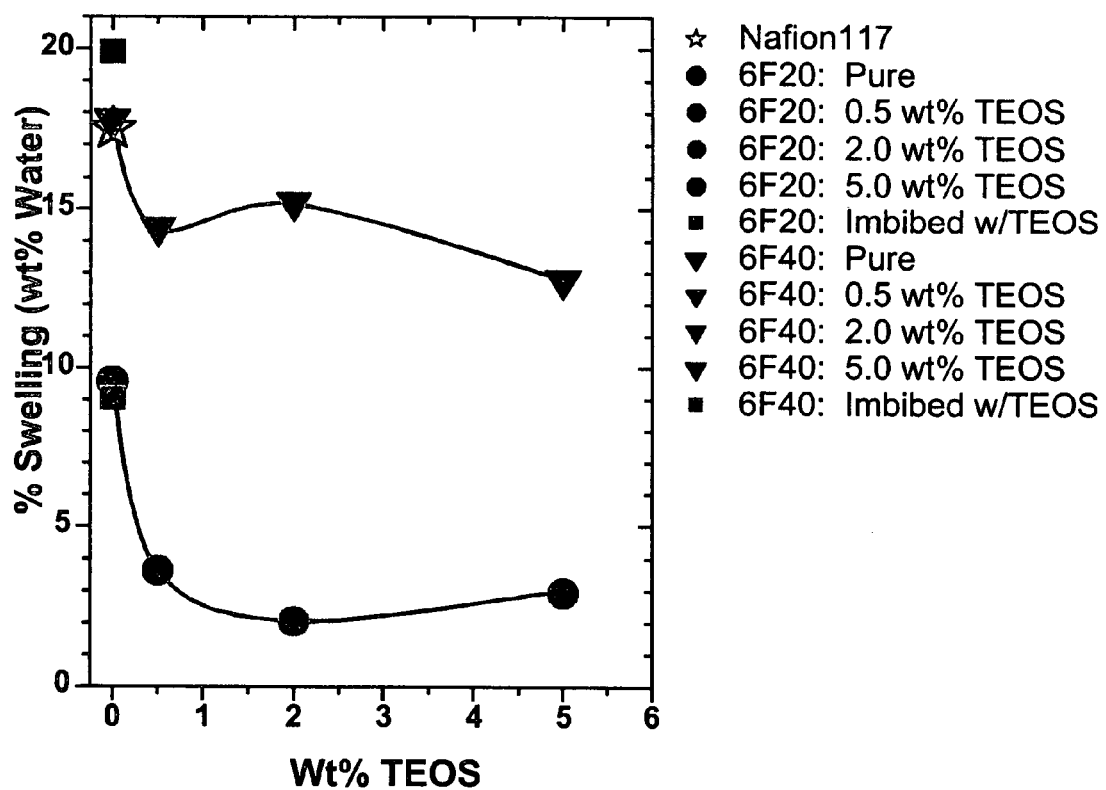
FIG. 13 Swelling characteristics of 6F20 and 6F40 copolymers and hybrid materials.

The water absorption behavior of these hybrid organic-inorganic materials is shown in FIG. 13 as a function of TEOS content. From this plot a general trend of decreasing swelling or water uptake is associated with increasing TEOS content. However, imbibing the 6F20 and 6F40 materials with TEOS did not lead to an appreciable decrease in the swelling characteristics of the hybrid materials. The swelling behavior of the 6F20 material decreased 80% in its swelling characteristics, which is also 90% lower than Nafion.

The 6F40 material had a decrease in swelling of 27% relative to Nafion® and the 6F40 homopolymer. The rationale for the observed decrease in water absorption is thought to be due to decreasing free volume in the hybrid organic-inorganic materials, and restricted polymer chain mobility. These effects would decrease the hybrid materials ability to absorb water. It is thought that the imbibed materials had very localized inorganic domains located near the sulfonic acid groups. The result of such an interaction would be enhanced thermally stability, which was observed in the thermogravimetric analysis (TGA) scans. Because additional particles are not dispersed throughout the polymer matrix, it is anticipated that little impact on free volume and segmental mobility would results, which would result in little change in the swelling behavior. Finally, this technique reveals the value of hybrid organic-inorganic materials is reducing the swelling behavior of PEM materials.

Thermal Stability

The thermal stability of Nafion®, and the 6F20 and 6F40 polyimides and hybrid organic-inorganic materials were assessed using a High-Resolution TA 2950 TGA instrument. Experimental runs were completed on dry thin films having an average mass of 15 mg, and a scan rate of 20° C. per minute from 30° C. to 900° C. with a 20 ml per minute nitrogen purge. The reproducibility in these measurements was found to have a relative error of 7%.

Figure 14:
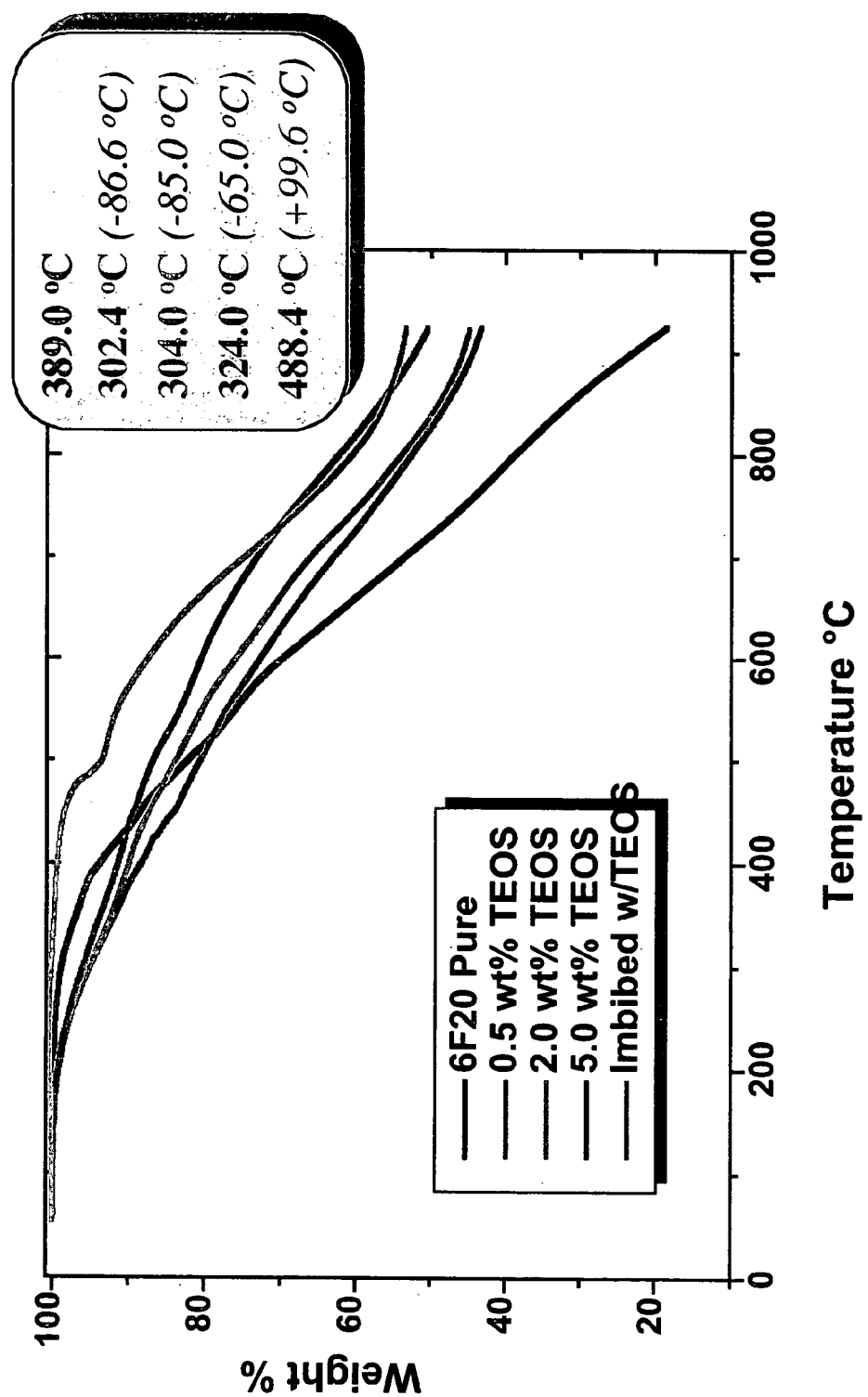
FIG. 14 TGA spectra of 6F20 hybrid materials.
Figure 15:
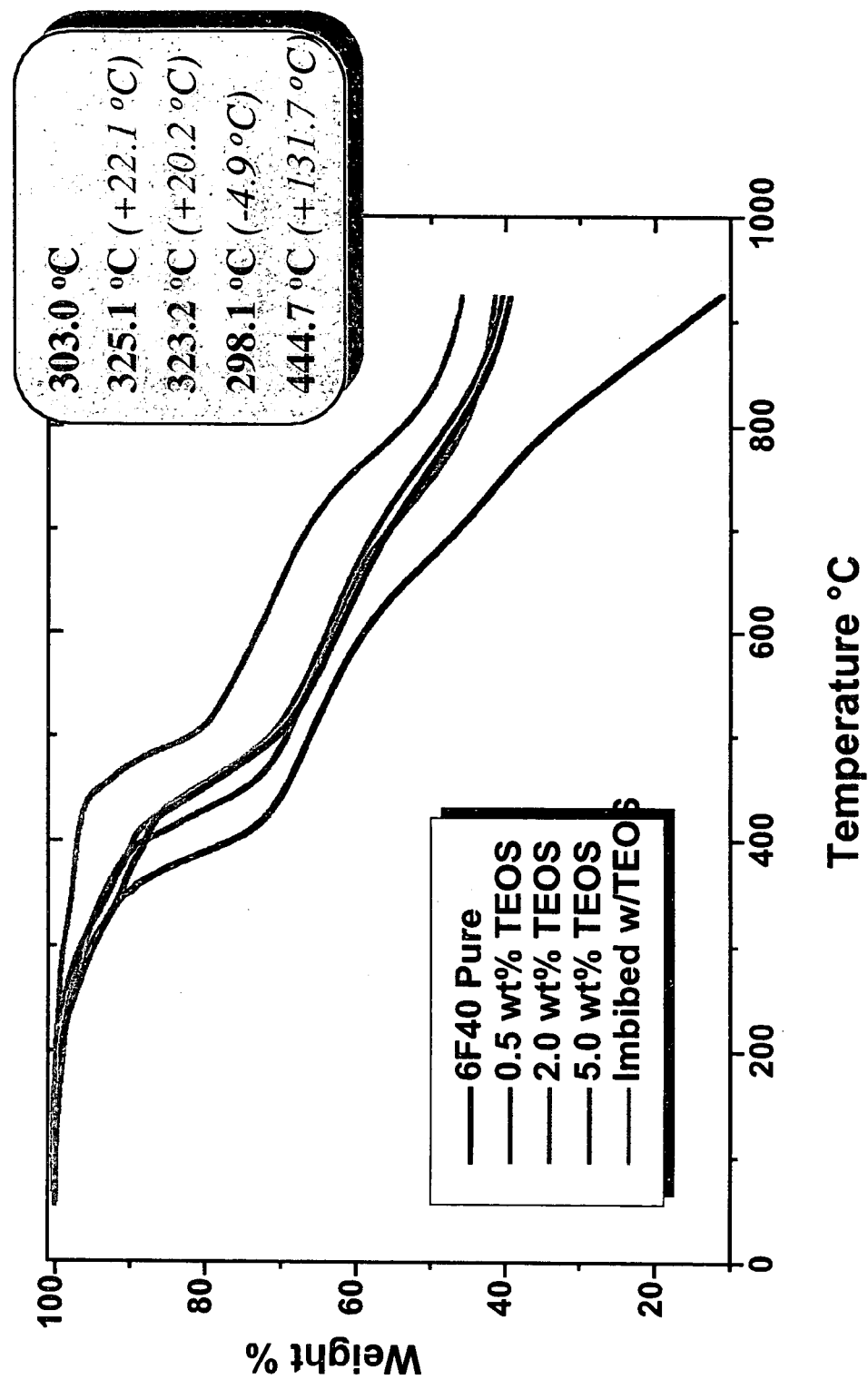
FIG. 15 TGA spectra of 6F40 hybrid materials.

The thermal stability of a series of 6F20 based hybrid organic-inorganic materials is shown in FIG. 14 as a function of weight loss and temperature. The results from these thermograms indicate that all the hybrid materials alter the overall mechanism of thermal decomposition. Of particular note is the improvement in the decomposition temperature, and overall thermal stability of the imbibed 6F20 material. Imbibing this material led to a 100° C. improvement the thermal stability of the base 6F20 homopolymer, as characterized by the temperature associated with 5% weight loss. This effect was not realized for the other 6F20 hybrid organic-inorganic materials, which is attributed to poor inorganic dispersion throughout the polymer matrix. This particle-filled morphology was apparent from all the SEM images taken of the 6F20 hybrid system. Of particular interest for these hybrid organic-inorganic materials is the improvement in thermal stability with the improvement in material homogeneity, as demonstrated for the 6F20 imbibed material. The SEM images of the 6F40 hybrid organic-inorganic material revealed that increasing the sulfonic acid content to 40 mol % resulted in a remarkably better nanocomposite material for both the imbibed material as well as the nanocomposites. The thermal stability of the 6F40 based hybrid organic-inorganic materials is shown in FIG. 15. As with the 6F20 materials, the results from the TGA scans indicate that all the 6F40 hybrid materials alter the overall mechanism of thermal decomposition. Furthermore, a general trend of increased decomposition temperature was noted for all the hybrid materials, except for the 6F40 hybrid with 5.0 wt % TEOS. Although there is a 20° C. increase in thermal stability of the 0.5 wt % and 2.0 wt %, no trend is apparent from these results. The most significant change in the decomposition temperature of the hybrid organic-inorganic material was associated with the imbibed 6F40 material. Imbibing led to a 132° C. improvement the thermal stability of the base 6F40 homopolymer. This is a 47% improvement in the thermal stability of the 6F40 homopolymer. These improvements in thermal stability are associated with the nanodispersion of TEOS particles throughout the polymer matrix, which was not realized for the 6F20 materials (except for the imbibed sample). These results demonstrate the significance of particle size and its affects not only on the thermal stability of the polymer, but also on the bulk physical properties of the final hybrid organic-inorganic material. Although not a part of this study, future work regarding the thermal stability of the PEM material in a humidified environment should be completed to evaluate the materials long-term stability, which is relevant to an operating fuel cell.

Mechanical Properties

Dynamic Mechanical Thermal Analysis (DMTA) spectroscopy was used to characterize the $T_g$ and molecular transitions in the polyimides with a Rheometric Scientific Mark IV DMTA. Experimental runs were completed on dry film samples having a length of 15 mm, a width of 4 mm, and a nominal thickness of 0.07 mm. The run conditions were conducted with a strain of 0.01%, a constant static force of 0.015 N, and a heating rate of 2° C. per minute in air. The low strain and force were chosen in order to ensure a linear viscoelastic response (stress proportional to strain) during an experimental run. Furthermore, the sample dimensions were set to exceed a length to width ratio of three to minimize sample edge effects during a DMTA test. Because all the samples elongated various degrees during a test, the data reported from this instrument was only from the first heating run. The reproducibility in measuring the $T_g$ was found to be 0.2% or 0.5° C. for the results discussed in the following section.

Figure 16:
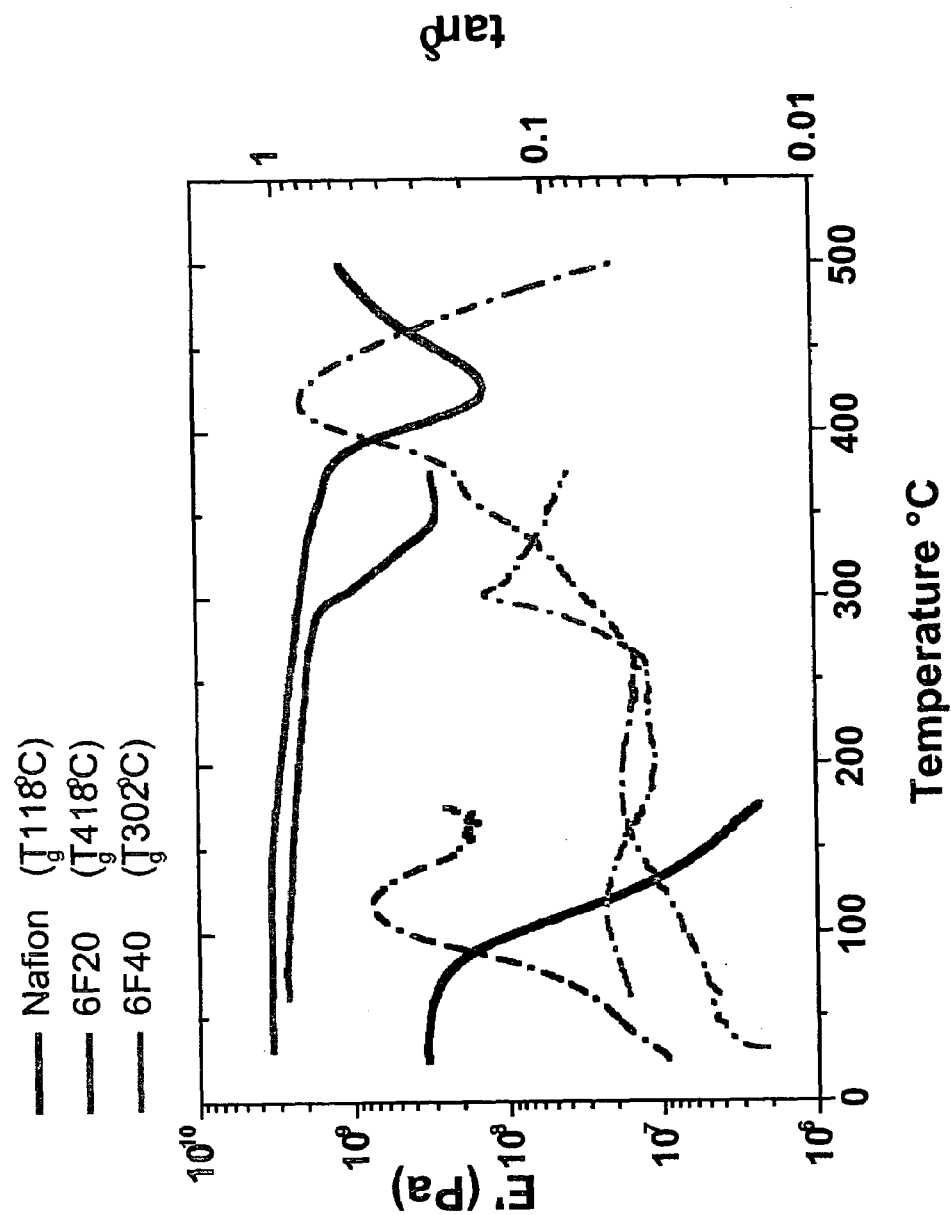
FIG. 16. DMTA for 6F20, 6F40, and Nafion® 117 showing changes in E' and tanδ.
Figure 17:
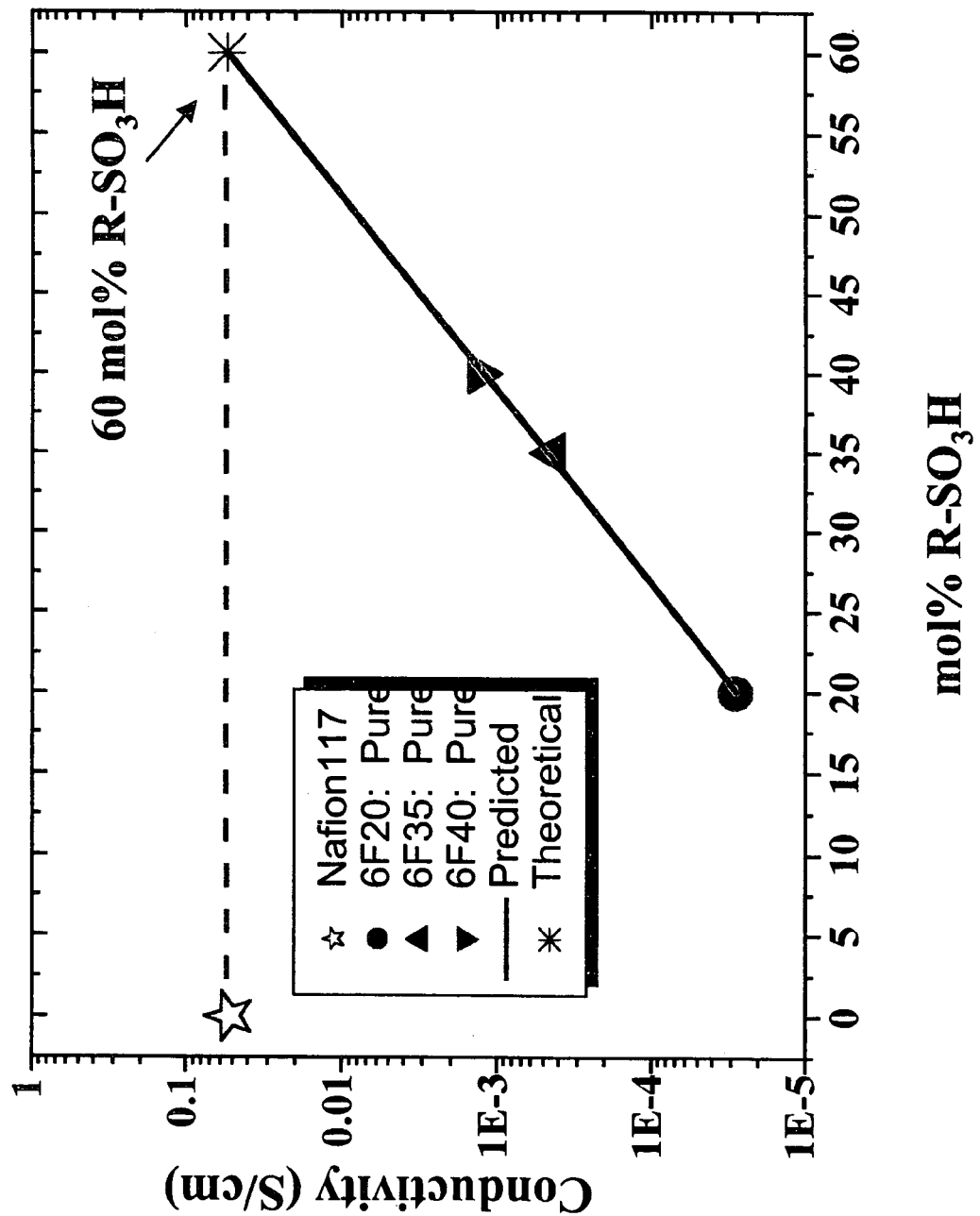
FIG. 17 Conductivity of 6FDA-DAS-PDA-DASA copolymers and Nafion 117.

The $T_g$ and storage modulus (E') for 6F20, 6F40, and Nafion® 117 are summarized in FIG. 16. A $T_g$ of 418° C. was observed for 6F20, a $T_g$ of 302° C. was observed for 6F40, and a $T_g$ of 118° C. was observed for Nafion® 117. Completely dry Nafion® has been reported by others to have a $T_g$ near 150° C. as determined by differential scanning calorimetry (DSC). The lower $T_g$ is attributed to water plasticization that will reduce the $T_g$ of Nafion® to c.a. 100° C. when it is completely hydrated. The 116° C. reduction in $T_g$ of 6F40 material is not only significant, but raises questions with regard to the degree of plasticization in the 6F40 system. Further work needs to be completed in the area of hydrogen bonding in these polyimide PEM materials to qualitatively determine the amount of water remaining in its structure.

Examination of the tanδ peak for the 6F20 system reveals that another transition is occurring in this material at c.a. 360° C. This bimodal behavior in the $T_g$ is what one would expect for a polymer material containing two distinct phases. Furthermore, the broad tanδ transition of nearly 200° C. indicates a significant amount of molecular motion occurring and polymer chain environments for this system. The complexity of the morphology of this polymer system was observed in the AFM-TM images. In contrast to this complex system, the 6F40 material has a very sharp tanδ transition, which implies a quick onset of cooperative polymer chain motion. The moderately broad tanδ transition in Nafion® 117 is partly due to the semicrystalline nature of Nafion®, where tie chains provide additional reinforcement of amorphous regions that are not present in wholly amorphous materials, such as the polyimides considered in this work. A significant difference between the polyimide systems and Nafion® 117 beyond the $T_g$ is the order of magnitude difference in E'. The transition of E' from the glassy state ($10^9$ Pa) to the rubbery state ($10^6$ Pa) gives an indication of the mechanical working temperature of the polymer. Relative to Nafion®, it appears that these polyimides may have a working temperature at least 100° C. better than Nafion®. If this is valid, then the operating temperature of a fuel cell employing these materials could be operated at temperatures above 100° C. In order to validate these statements regarding working temperature of the polymer, the $T_g$ in the plasticized state of the polyimides needs to be completed relative to Nafion®. Although not a part of this study, the effect of water content in the PEM and its affect on plasticizing the $T_g$ is relevant for understanding the operating temperature limitations. This is relevant to the design of PEM materials for high temperature fuel cells.

PEM Material Conductivity

Electrochemical Impedance Spectroscopy (EIS) was used to collect proton conductivity data for these materials. The instrument and settings used to collect the data were a PAR 273A potentiostat and Schlumberger 1255 High Frequency Analyzer with Z-plot software measuring over a frequency range of 100 kHz to 0.1 Hz at 0V versus an open circuit and a 10 mV amplitude. A series of Nyquist plots were generated based upon this experimental setup represented by real (Z') and imaginary resistance (Z") in Ohms. The intercept of the x-axis of the imaginary Z" with the real Z' in conjunction with the film thickness and electrode area is used to determine the proton conductivity of PEM materials. Measurements were preformed on PEM samples that were allowed to swell and equilibrate in deionized water at 25° C. Proton conductivity was determined from these samples by quickly removing the swollen films from the water and measuring their resistance. The following proton conductivity results are based upon this experimental approach, and thin films having a nominal thickness of 2.5 mil or 63.5 μm.

The ideal proton conductivities of thin films based upon the alternating copolymer 6FDA-DAS-PDA-DASA are shown in FIG. 16. This figure shows that at 20 mol % DASA a conductivity of 2.0E-5 S/cm was achievable, which increased to 4.73E-4 S/cm at 35 mol % DASA, and finally to 1.2E-3 S/cm at 40 mol % DASA. The linear logarithmic relationship between conductivity and sulfonic acid content indicates that these PEM materials are well within the percolation threshold necessary for proton conduction. If this percolation relationship is extrapolated out to the same conductivity of Nafion®, a 60 mol % DASA concentration may be necessary for conductivities to be equivalent to Nafion's conductivity of 5.0E-2 S/cm. In order to achieve this equivalent degree of sulfonation, different sulfonic acid containing moieties with an equivalent concentration to the 60 mol % must be used. Therefore, this sulfonic acid content does not pose a problem for future PEM materials. Future work could be directed at investigating the relationship between acid content and molecular weight between polymer segments, and its impact on proton conductivity as well as other PEM physical properties.

Figure 18:
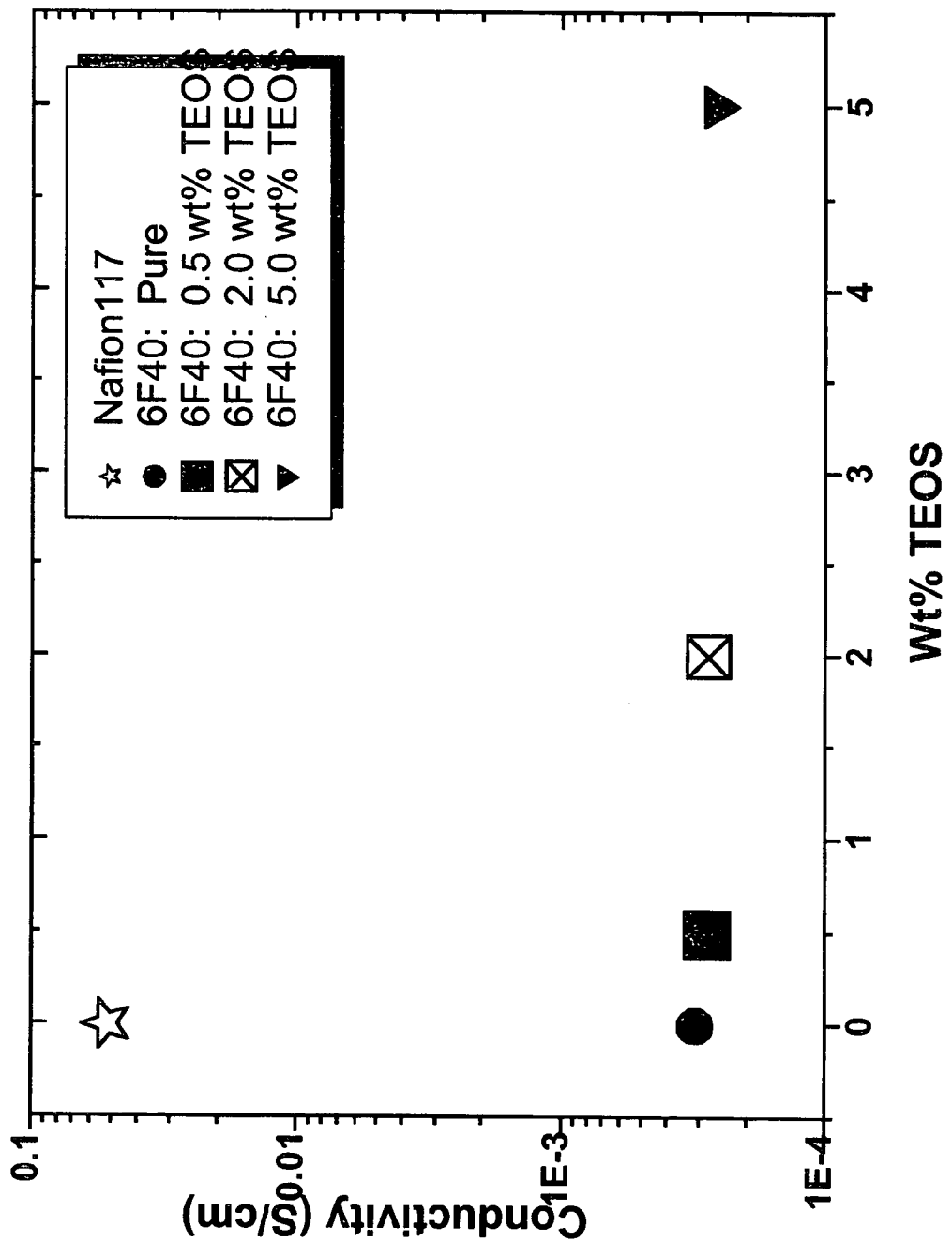
FIG. 18 Conductivity of 6F40 hybrid inorganic-organic materials and Nafion 117.

Ideal proton conductivities of hybrid organic-inorganic PEM materials based on 6F40 are shown in FIG. 18. This figure shows the losses in conductivity for the 6F40 hybrid organic-inorganic materials. The proton conductivity of hybrid materials containing 0.5 wt % and 2.0 wt % TEOS decreased 9.7%, which decreased by 16.1% at 5.0 wt % TEOS. Although these are net losses in the conductivity of the PEM material, future work will be aimed at introducing inorganic materials that have their own inherent proton conductivity. Furthermore, it should be noted that these hybrid organic-inorganic materials reduced swelling, decreased $O_2$ and $H_2$ permeability, and appeared to increase the thermal stability of the final PEM. The added benefits of increased material properties may yield PEM materials that are not achievable with Nafion. Such added benefits include being able to operate the DMFC at elevated temperatures, which previously discussed would significantly improve the performance of the fuel cell. It is also anticipated that the rate of methanol crossover would be reduced due to restricted chain mobility that would lead to more favorable kinetics at the anode. While these physical property improvements are thought to be achievable with hybrid organic-inorganic materials, their impact may outweigh any losses in conductivity as observed in FIG. 18.

This work revealed that about 60 mol % DASA was necessary to achieve conductivities equivalent to Nafion, which is achievable by synthesizing new monomers. Swelling was also shown to decrease by as much as 80% for these $1^{st}$ generation PEM materials, which is a desirable trait in any PEMFC. While there was a reduction in PEM swelling, it did not result in a significant reduction in proton conductivity. Furthermore, reduced swelling also implies that there could be a proportional decrease in $CH_3OH$ crossover. Reduced swelling in these PEM hybrid organic-inorganic materials also revealed that the number of water molecules surrounding each sulfonic acid group decreased, which might imply that the level of hydration required for proton conduction is reduced. This result may lead to PEM materials that are more robust with respect to elevated temperatures and PEM dehydration. It is postulated that the relatively unchanged PEM proton conductivity may be due to the high concentration of silanol groups, which compensates for the lost water and aids in proton conductivity. Increased thermal stability was attributed to the presence of the inorganic phase and how it is distributed in the polymer matrix. Imbibed samples saw increases in polymer PEM stability by 100° C. and 132° C. for 6F20 and 6F40, respectively. This increased stability is believed to be a necessary material trait for PEM materials to be operated at elevated temperatures. Decreased $O_2$ and $H_2$ permeability was observed in these hybrid materials, which is very important for $H_2$ based PEMFCs. The novel PEM materials generated in this work are believed to have reduced methanol crossover because of the observed reduction in swelling for these hybrid PEM materials. These reductions are believed to be due to the reduction in the segmental mobility of the polymer chains, which can be modulated by the inorganic content. Further control over the PEM material properties may be achieved by controlling the molecular weight between each segment in the alternating copolymer. Hybrid Organic-Inorganic PEM nanocomposites based on these optimized materials should possess enhanced physical properties over Nafion®.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A sulfonated polyimide copolymer, comprising alternating polyimide segments, having the following chemical structure:

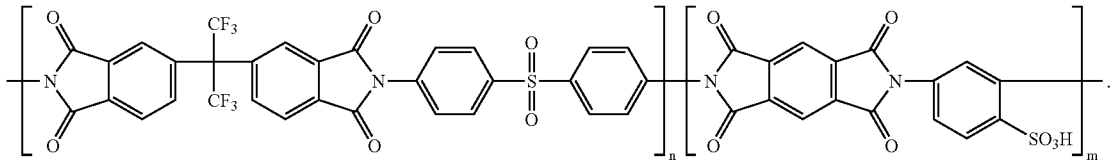

2. The sulfonated polyimide copolymer of claim 1 wherein a FTIR-ATR spectrum of said copolymer is characterized by:

a) the absence of a polyamic acid peak at about 1670 $cm^{-1}$, indicating substantial completion of imidization reactions; and b) the presence of a sulfonic acid peak at 1159 $cm^{-1}$.

3. A method of making a sulfonated polyimide copolymer, comprising the steps of:

a) combining and reacting a stoichiometric amount of 4,4' hexafluorisopropylidene diphtalic anhydride (6FDA) and 4,4'-diaminosulfone aniline (DAS) in the presence of a catalyst and a solvent to produce a first solution comprising an unsulfonated hydrophobic 6FDA-DAS polyimide;

b) combining and reacting a stoichiometric amount of pyromellitic dianhydride (PDA) and 2,4-diaminobenzosulfonic acid (DASA) in the presence of the catalyst and the solvent to produce a second solution comprising a sulfonated PDA-DASA polyimide; and then c) combining and reacting the fist solution comprising the 6FDA-DAS polyimide with the second solution comprising the PDA-DASA polyimide to produce a third solution comprising a 6FDA-DAS-PDA-DASA sulfonated polyimide copolymer comprising alternating polyimide segments.

4. The method of claim 3, wherein the reaction in step a) is performed at about 80 C.

5. The method of claim 3, wherein the reaction in step b) is performed at about 80 C.

6. The method of claim 3, wherein the catalyst is triethylamine (TEA).

7. The method of claim 3, wherein the reaction in step c) is performed at about 130 C.

8. The method of claim 3, wherein the solvent comprises 1-methyl-2-pyrollidinone (NMP).

9. The method of claim 3, further comprising using Carother's equation to control the final molecular weight of the polyimide 6FDA-DAS-PDA-DASA by changing the reactants stoichiometry of dianhydrides (6FDA and PDA) and diamines (DAS and DASA) to a ratio of 1:1.

10. The method of claim 8, wherein the solvent additionally comprises 1,3-dichlorobenzene (DCB).

11. The method of claim 10, wherein the molar ratio of NMP to DCB in the solvent is 4:1.

12. The method of claim 10, further comprising removing water formed during cyclodehydration of the compound as shown below by forming a low boiling point azeotrope with the DCB during step c)

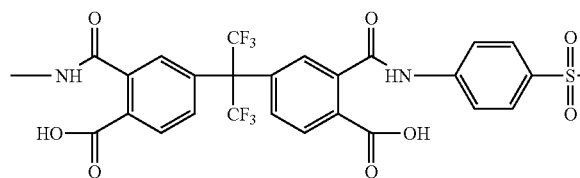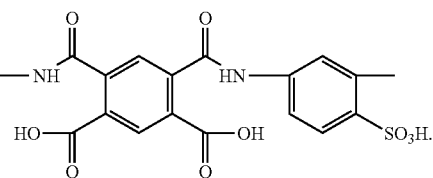

13. The method of claim 10, further comprising distilling out the low boiling point azeotrope by utilizing an Allhin condenser and a Dean-Stark trap during step c).

14. The method of claim 13, further comprising maintaining a constant solvent volume during step c) by replacing azeotroped DCB with new DCB via the Dean-Stark trap.

15. The method of claim 3, wherein the reaction in step c) is performed for at least about 24 hours.

16. The method of claim 3, wherein the reactions in steps a) and b) are each performed for at least about 16 hours.

17. The method of claim 3, further comprising after step c):
  d) cooling the third solution comprising 6FDA-DAS-PDA-DASA sulfonated polyimide copolymer to room temperature;
  e) filtering the cooled third solution with a 0.8 micron nylon filter; and
  f) precipitating the 6FDA-DAS-PDA-DASA into methanol to produce a solid precipitate that subsequently can be re-dissolved and cast on glass plates to produce thin films.

18. The method of claim 17, further comprising after step f) casting of a film of 6FDA-DAS-PDA-DASA sulfonated polyimide copolymer PEM from a solution of N-methyl-2-pyrrolidone (NMP) and the copolymer PEM onto a hot plate heated to about 60 C, followed by drying in a vacuum oven at about 120 C for at least 24 hours.

19. A sulfonated polyimide copolymer produced according to the process of claim 3.

20. The sulfonated polyimide copolymer of claim 19, wherein the concentration of DASA is about 20 mol %.

21. The sulfonated polyimide copolymer of claim 20, wherein the amount of swelling resulting when the copolymer is exposed to water is less than or equal to about 3 wt % swelling.

22. The sulfonated polyimide copolymer of claim 20, wherein the temperature at which a 5% weight loss occurs is greater than about 480 C.

23. The sulfonated polyimide copolymer of claim 20, wherein $T_g$, as measured by Dynamic Mechanical Thermal Analysis (DMTA), is greater than or equal to about 410 C.

24. The sulfonated polyimide copolymer of claim 19, wherein the concentration of DASA is about 40 mol %.

25. The sulfonated polyimide copolymer of claim 24, wherein the $H_2$ gas permeability is equal to or less than about 70 barrers, and the $O_2$ gas permeability is equal to or less than bout 6 barrers.

26. The sulfonated polyimide copolymer of claim 24, wherein the temperature at which a 5% weight loss occurs is greater than about 440 C.

27. The sulfonated polyimide copolymer of claim 24, wherein $T_g$, as measured by Dynamic Mechanical Thermal Analysis (DMTA), is greater than or equal to about 300 C.

28. The sulfonated polyimide copolymer of claim 24, wherein the electrical conductivity is greater than or equal to about $1.2 \times 10^{-3}$ S/cm.

29. The sulfonated polyimide copolymer of claim 19, wherein the concentration of DASA is about 60 mol %.

30. The sulfonated polyimide copolymer of claim 29, wherein the electrical conductivity is greater than or equal to about $5 \times 10^{-2}$ S/cm.

31. The sulfonated polyimide copolymer of claim 19, wherein the concentration of DASA is from about 20 mol % to about 60 mol %.

32. The sulfonated polyimide copolymer of claim 19, further comprising an inorganic phase comprising about 0.5 wt % to about 5.0 wt % tetraethylyorthosilicate (TEOS).

33. The method of claim 17, further comprising:
  a) providing a polymer solution A comprising a 6FDA-DAS-PDA-DASA sulfonated polyimide copolymer produced according to claim 17;
  b) providing a sol solution B comprising TEOS;
  c) combining the polymer solution A with the sol solution B and mixing until a homogenous solution C results, comprising the hybrid organic-inorganic material.

34. The method of claim 33, further comprising forming a film of the hybrid organic-inorganic material by casting solution C on a heated plate to make the film, and then baking the film in a vacuum oven.

35. The method of claim 33, wherein the plate is heated to at least 60 C, and the vacuum oven is heated to at least 150 C.

36. The method of claim 33, wherein polymer solution A comprises a solution of 6FDA-DAS-PDA-DASA sulfonated polyimide copolymer and NMP, wherein the concentration of copolymer is about 15 wt %.

37. The method of claim 33, wherein sol solution B comprises a mixture of TEOS, ethanol, water and 1.0 M HCL in the molar ratio of 1:3.8:9.8:0.01.

38. The method of claim 17, further comprising placing a piece of the 6FDA-DAS-PDA-DASA sulfonated polyimide copolymer into a diluted TEOS and solution for a period of time sufficient for the TEOS to be imbibed into the piece of 6FDA-DAS-PDA-DASA sulfonated polyimide copolymer.

39. The method of claim 38, wherein the diluted TEOS sol solution comprises a mixture of TEOS, ethanol, water, and 1.0 M HCL in the molar ratio of 1:3.8:9.8:0.01.

40. The method of claim 38, wherein the concentration of TEOS in the hybrid organic-inorganic material is about 1.3 wt % to about 1.6 wt % TEOS.

* * * * *